US009671828B2

(12) United States Patent
Lee et al.

(10) Patent No.: US 9,671,828 B2
(45) Date of Patent: Jun. 6, 2017

(54) MOBILE TERMINAL WITH DUAL TOUCH SENSORS LOCATED ON DIFFERENT SIDES OF TERMINAL BODY AND METHOD OF CONTROLLING THE SAME

(71) Applicant: LG ELECTRONICS INC., Seoul (KR)

(72) Inventors: Seojin Lee, Seoul (KR); Choonghwan Shin, Seoul (KR); Samsick Kim, Seoul (KR); Donghwan Yu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/042,042

(22) Filed: Feb. 11, 2016

(65) Prior Publication Data
US 2016/0162112 A1 Jun. 9, 2016

Related U.S. Application Data

(63) Continuation-in-part of application No. 14/620,957, filed on Feb. 12, 2015, now Pat. No. 9,547,336.

(30) Foreign Application Priority Data

Sep. 19, 2014 (KR) .................. 10-2014-0125145
Sep. 30, 2014 (KR) .................. 10-2014-0131811
Mar. 24, 2015 (KR) .................. 10-2015-0040892

(51) Int. Cl.
*G06F 3/041* (2006.01)
*G06F 1/16* (2006.01)
(Continued)

(52) U.S. Cl.
CPC .......... *G06F 1/1652* (2013.01); *G06F 1/1694* (2013.01); *G06F 3/0481* (2013.01);
(Continued)

(58) Field of Classification Search
CPC ......... G06F 1/1628; G06F 2203/04104; G06F 3/041; G06F 3/0416; G06F 1/1652;
(Continued)

(56) References Cited

U.S. PATENT DOCUMENTS

2007/0222765 A1   9/2007  Nyyssonen
2007/0291008 A1* 12/2007  Wigdor ............... G06F 1/1613
                                              345/173
(Continued)

FOREIGN PATENT DOCUMENTS

EP    2363793       9/2011
EP    2675141       12/2013
(Continued)

OTHER PUBLICATIONS

European Patent Office Application Serial No. 14194936.2, Search Report dated Mar. 9, 2016, 6 pages.
(Continued)

*Primary Examiner* — Lun-Yi Lao
*Assistant Examiner* — Elliott Deaderick
(74) *Attorney, Agent, or Firm* — Lee, Hong, Degerman, Kang & Waimey

(57) ABSTRACT

A mobile terminal includes a terminal body; a display located on a first side of the terminal body, the display including a plurality of areas; a first touch sensor located at the display; a second touch sensor located on a second side of the terminal body, the second side being an opposite side of the first side; and a controller configured to cause the display to display screen information in response to preset touches including a first touch applied to a first touch region of the first touch sensor and a second touch applied to a second touch region of the second touch sensor, wherein the screen information and an area of the display on which the screen information is displayed are determined based on
(Continued)

which one of the plurality of areas the first touch region corresponds to.

19 Claims, 31 Drawing Sheets

(51) Int. Cl.
| | | |
|---|---|---|
| *G06F 3/0481* | (2013.01) | |
| *G06F 3/0483* | (2013.01) | |
| *G06F 3/0488* | (2013.01) | |
| *G06F 3/0484* | (2013.01) | |
| *H04M 1/02* | (2006.01) | |
| *H04M 1/18* | (2006.01) | |

(52) U.S. Cl.
CPC ........ *G06F 3/0483* (2013.01); *G06F 3/04842* (2013.01); *G06F 3/04847* (2013.01); *G06F 3/04886* (2013.01); *G06F 2200/1633* (2013.01); *G06F 2200/1634* (2013.01); *H04M 1/0214* (2013.01); *H04M 1/0268* (2013.01); *H04M 1/185* (2013.01); *H04M 2250/12* (2013.01); *H04M 2250/22* (2013.01)

(58) Field of Classification Search
CPC ........... G06F 1/1694; G06F 2200/1633; G06F 2200/1634; G06F 3/0481; G06F 3/0483; G06F 3/04842; G06F 3/04847; G06F 3/04886; H04M 1/0214; H04M 1/185; H04M 2250/12; H04M 2250/22; H04M 1/0268

See application file for complete search history.

(56) References Cited

U.S. PATENT DOCUMENTS

| | | |
|---|---|---|
| 2009/0323262 A1 | 12/2009 | Arita |
| 2010/0164871 A1 | 7/2010 | Shigeta et al. |
| 2011/0074716 A1* | 3/2011 | Ono ....................... G06F 1/1626 345/173 |
| 2011/0080359 A1 | 4/2011 | Jang et al. |
| 2011/0163986 A1* | 7/2011 | Lee ........................ G06F 1/1692 345/173 |
| 2012/0212430 A1 | 8/2012 | Jung et al. |
| 2014/0009415 A1* | 1/2014 | Nishida ............... G06F 3/04886 345/173 |
| 2014/0078086 A1* | 3/2014 | Bledsoe .................. G06F 3/041 345/173 |
| 2014/0164976 A1* | 6/2014 | Kim ...................... G06F 1/1643 715/773 |
| 2014/0253440 A1* | 9/2014 | Karakotsios .......... G06F 1/1692 345/157 |
| 2015/0022471 A1* | 1/2015 | Kwak ................... G06F 1/3265 345/173 |
| 2015/0026638 A1 | 1/2015 | Kim et al. |
| 2015/0061881 A1 | 3/2015 | Jeon et al. |
| 2015/0062126 A1 | 3/2015 | Lee et al. |
| 2015/0065207 A1 | 3/2015 | Hong et al. |
| 2015/0261366 A1* | 9/2015 | Wong .................... G06F 1/1626 345/173 |
| 2015/0278529 A1 | 10/2015 | Cho |
| 2016/0085327 A1 | 3/2016 | Lee et al. |
| 2016/0197637 A1 | 7/2016 | Lee et al. |

FOREIGN PATENT DOCUMENTS

| | | |
|---|---|---|
| EP | 2711813 | 3/2014 |
| EP | 2765760 | 8/2014 |
| WO | 2013/150514 | 10/2013 |
| WO | 2014/139111 | 9/2014 |

OTHER PUBLICATIONS

European Patent Office Application No. 16150282.8, Search Report dated Jul. 28, 2016, 10 pages.

* cited by examiner

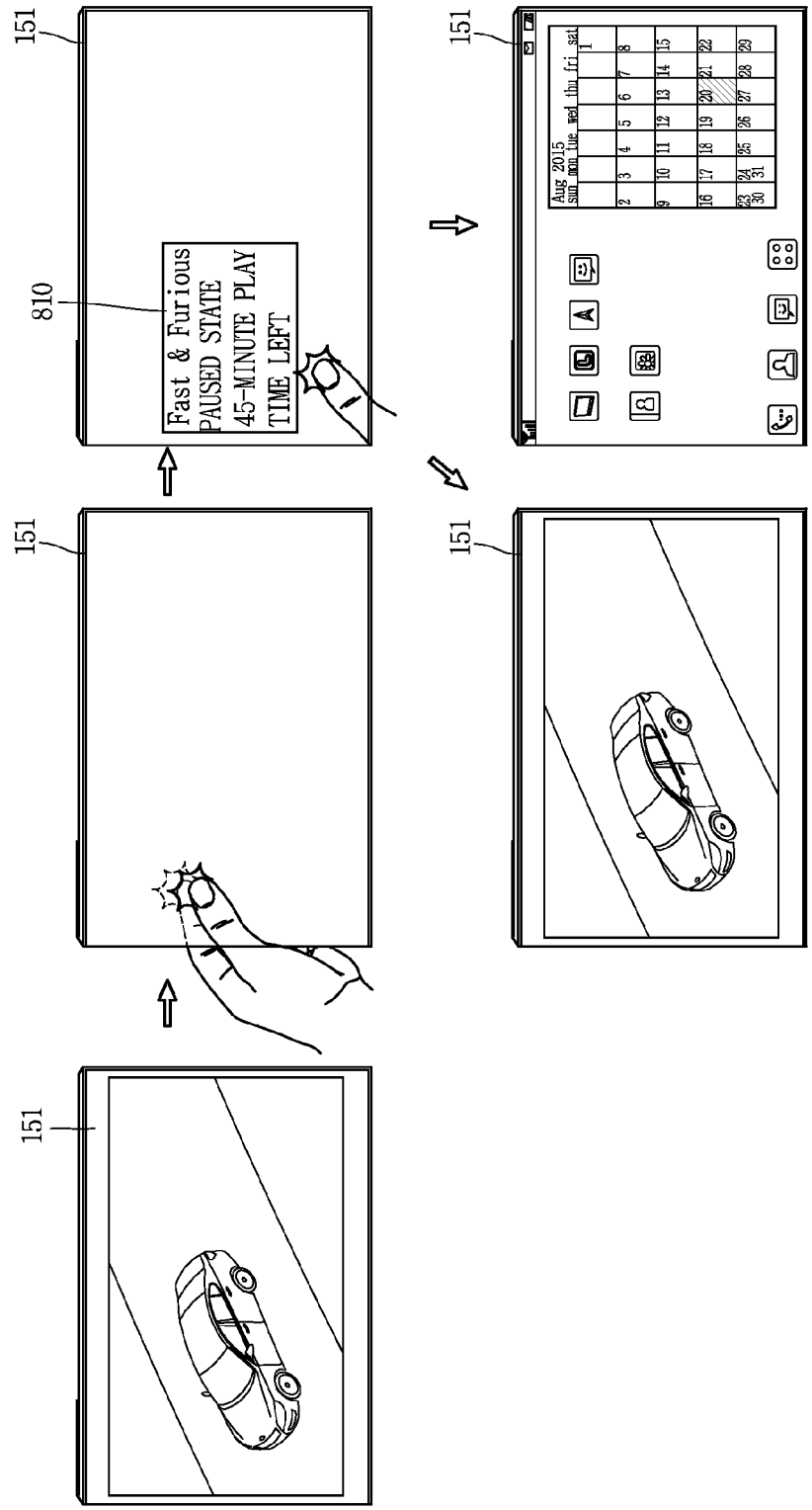

MOBILE TERMINAL WITH DUAL TOUCH SENSORS LOCATED ON DIFFERENT SIDES OF TERMINAL BODY AND METHOD OF CONTROLLING THE SAME

CROSS-REFERENCE TO RELATED APPLICATION

This application is a continuation-in-part of U.S. patent application Ser. No. 14/620,957 filed on Feb. 12, 2015, now U.S. Pat. No. 9,547,336, which claims the benefit of earlier filing date and right of priority to Korean Patent Application No. 10-2014-0125145 filed on Sep. 19, 2014 and Korean Patent Application No. 10-2014-0131811 filed on Sep. 30, 2014, the contents of which are all hereby incorporated by reference herein in their entirety, and this application also claims the benefit of earlier filing date and right of priority to Korean Patent Application No. 10-2015-0040892 filed on Mar. 24, 2015, the contents of which are hereby incorporated by reference herein in its entirety.

BACKGROUND OF THE INVENTION

1. Field of the Invention

This specification relates to a mobile terminal and a method of controlling the same.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Many efforts include not only changes and improvement of structural components implementing a mobile terminal but also software improvement to support and improve functions of the terminal.

Such portable electronic device is evolving into various forms of designs, and many efforts for developing new types of portable electronic devices are undergoing in order to meet users' needs for newer and more various forms of designs. The new types include the structural change and improvement for facilitating users to more conveniently use the portable electronic devices. As one of such structural changes and improvement, a portable electronic device with a display unit whose at least part can be curved or bent is coming into the spotlight.

As such, with more attention paid on the portable electronic device with the display unit whose at least part can be curved or bent, user-friendly user interfaces using such characteristic are required. That is, the characteristic of the bendable or curvable portable electronic device arouses a creation of a new user interface area which was limitedly or impossibly applied in the conventional art.

Also, in recent time, an active development for a cover (or a pouch) covering at least part of the mobile terminal to protect the mobile terminal is ongoing. As a result, a method of more enhancing use convenience of the terminal using the cover may be considered.

SUMMARY OF THE INVENTION

Therefore, an aspect of the detailed description is to provide a mobile terminal, which enables a user to select and execute a desired function in a mobile terminal in an easier and convenient manner, and a method of controlling the same.

Another aspect of the detailed description is to provide a mobile terminal, which enables a user to select and execute a desired function in a mobile terminal without a complicated process of opening and closing menu select screens several times, and a method of controlling the same.

Another aspect of the detailed description is to provide a mobile terminal, capable of fast accessing frequently-used applications, and a method of controlling the same.

Another aspect of the detailed description is to provide a mobile terminal, capable of receiving a new type of user input, different from the related art.

Another aspect of the detailed description is to provide a portable electronic device, capable of being controlled based on a characteristic of a curvable or bendable display unit and a touch applied to the display unit, and a method of controlling the same.

To achieve these and other advantages and in accordance with the purpose of this specification, as embodied and broadly described herein, there is provided a mobile terminal including a terminal body, a display unit disposed on a front surface of the terminal body, a first touch sensor provided on the display unit disposed on the front surface, a second touch sensor provided on a rear surface of the terminal body, and a controller configured to output screen information corresponding to a function associated with preset touches on the display unit, when the preset touches are applied simultaneously to a first touch region with the first touch sensor and a second touch region with the second touch sensor.

In accordance with an embodiment, the controller may execute the function associated with the preset touches when the preset touches are applied simultaneously to the first and second touch regions, and output the screen information on one area of the display unit.

In accordance with an embodiment, an output position of the screen information on the display unit may differ according to a position where the preset touch is applied to the first touch region.

In accordance with an embodiment, when the preset touches are applied simultaneously to the first and second touch regions while a light of the display unit is turned off, the controller may partially turn on a light of one area of the display unit corresponding to a position where the preset touches are applied to the display unit, and output the screen information on the one area.

In accordance with an embodiment, the controller may output the screen information when an applied position of a first preset touch with respect to the first touch region and an applied position of a second preset touch with respect to the second touch region face each other.

In accordance with an embodiment, the controller may execute a different function according to a position where the preset touches are applied to the first and second touch regions.

In accordance with an embodiment, the display unit may be divided into first, second and third areas in a lengthwise direction thereof. Different functions may be associated with the first, second and third areas, respectively. The controller may execute a function associated with an area, to which the preset touches are applied, among the first, second and third areas, and output screen information corresponding to the executed function on the area, to which the preset touches are applied, among the first, second and third areas.

In accordance with an embodiment, detailed information related to the screen information output on one of the first, second and the third areas may be output when a touch is applied to the one area while the screen information is output on the one area.

In accordance with an embodiment, the detailed information may be output up to an area over the one area.

In accordance with an embodiment, the preset touches are a plurality of tap touches applied to the first and second touch regions. The controller may output screen information corresponding to a preset function, in response to the plurality of tap touches being applied simultaneously to the first and second touch regions. The controller may output detailed screen information corresponding to the preset function, in response to a drag touch being applied to an output area of the screen information.

In accordance with an embodiment, the controller may perform a function associated with screen information output on a touch-applied area, when the touch is applied to one of the first and second touch regions while the light of the display unit is turned on.

In accordance with an embodiment, the controller may perform a function associated with the preset touches, when the preset touches are applied simultaneously to the first and second touch regions while the light of the display unit is turned on, although a graphic object to be selected has been output on the touch-applied area.

In accordance with an embodiment, the display unit may output thereon screen information corresponding to the associated function, and the screen information corresponding to the associated function may overlap at least part of screen information which has been previously output on the display unit.

In accordance with an embodiment, the controller may additionally output detailed information related to the associated function, in response to a touch being applied to an output area of the screen information corresponding to the associated function.

In accordance with an embodiment, the controller may release the lock state when the preset touches are applied to the first and second touch regions in the lock state, and output the screen information corresponding to the function associated with the preset touches on at least part of the display unit.

In accordance with another embodiment of the present invention, a mobile terminal may include a body provided with a front surface and a rear surface, a display unit disposed on the front surface, a cover disposed to cover one of the front surface and the rear surface, and having a window portion, a sensor unit provided with at least one sensor disposed at a periphery of the window portion; and a controller configured to output on the display unit screen information related to a function associated with a user motion and a touch input sensed, when a user motion with respect to the rear surface is sensed through the sensor disposed at the periphery of the window portion and simultaneously a touch input with respect to the display unit is sensed while the cover closes the rear surface.

To achieve these and other advantages and in accordance with the purpose of this specification, as embodied and broadly described herein, there is provided a mobile terminal including a terminal body; a display located on a first side of the terminal body; a first touch sensor located at the display; a second touch sensor located on a second side of the terminal body, the second side being an opposite side of the first side; and a controller configured to cause the display to display screen information relating to a function corresponding to preset touches in response to the preset touches comprising a first touch applied to a first touch region including the first touch sensor and a second touch applied to a second touch region including the second touch sensor.

In accordance with an embodiment, the controller is further configured to: execute the function when the first touch and the second touch are applied simultaneously; and cause the display to display the screen information on one of a plurality of areas of the display.

In accordance with an embodiment, the one of the plurality of areas is variable according to a position of the first touch region to which the first touch is applied such that the screen information is displayed on a first area when the first touch is applied to a first position of the first touch region and the screen information is displayed on a second area when the first touch is applied to a second position of the first touch region.

In accordance with an embodiment, the preset touches are applied while the display is not illuminated; and the controller is further configured to cause illumination of the one of the plurality of areas corresponding to the position of the first touch region to which the first touch is applied such that the screen information is displayed on the illuminated one of the plurality of areas.

In accordance with an embodiment, the controller is further configured to cause the display to display the screen information when a first position of the first touch with respect to the first touch region corresponds to a second position of the second touch with respect to the second touch region or when the first position and the second position face each other.

In accordance with an embodiment, the controller is further configured to execute a different function based on a position to which the preset touches are applied with respect to the first touch region and the second touch region such that a first function is executed when the preset touches are applied to a first position with respect to at least one of the first touch region or the second touch region and a second function is executed when the preset touches are applied to a second position with respect to at least one of the first touch region or the second touch region.

In accordance with an embodiment, the display is configured as a first area, a second area, and a third area; each of the first area, the second area, and third area is associated with a different function; the controller is further configured to execute a function associated with one of the first area, the second area, or the third area to which the preset touches are applied; and the controller is further configured to cause the display to display screen information relating to the executed function on the one of the first area, the second area, or the third area.

In accordance with an embodiment, the controller is further configured to cause the display to display additional information related to the screen information displayed on the one of the first area, the second area, or the third area in response to a touch applied to the one of the first area, the second area, or the third area while the screen information is displayed.

In accordance with an embodiment, the additional information is displayed via at least two areas of the first area, the second area, or the third area.

In accordance with an embodiment, the first and second touches are tap touches; the controller is further configured to cause the display to display screen information corresponding to a preset function in response to the tap touches that are applied simultaneously to the first touch region and the second touch region; and the controller is further configured to cause the display to display additional screen information corresponding to the preset function in response to a drag touch applied to an output area of the display on which the screen information is displayed.

In accordance with an embodiment, the controller is further configured to execute the function associated with the screen information displayed on one of a plurality of areas of the display in response to a touch applied to one of the first touch region or the second touch region while the screen information is displayed, the one of the first touch region or the second touch region including the one area of the plurality of areas of the display.

In accordance with an embodiment, the controller is further configured to execute the function corresponding to the preset touches when the preset touches are applied to the first touch region and the second touch region simultaneously while a graphic object to be selected is displayed on the one of the plurality of areas of the display to which the touch is applied.

In accordance with an embodiment, the screen information relating to the function corresponding to the preset touches overlaps at least part of screen information which has been previously displayed on the display.

In accordance with an embodiment, the controller is further configured to cause the display to additionally display detailed information related to the function corresponding to the preset touches in response to a touch applied to a display area of the screen information corresponding to the function corresponding to the preset touches.

In accordance with an embodiment, the preset touches are received while the mobile terminal is in a lock state; the controller is further configured to unlock the mobile terminal in response to the preset touches; and the controller is further configured to cause the display to display the screen information on at least a portion of the display when the mobile terminal is unlocked.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 8A, 8B, 9A, 9B, 10A and 10B are conceptual views illustrating a method of performing various controls for a mobile terminal, using touches applied simultaneously to a first touch region and a second touch region, in the mobile terminal in accordance with the present invention;

FIGS. 11A and 11B are conceptual views illustrating a method of performing various controls for a mobile terminal, using touches applied simultaneously to a first touch region and a second touch region, while a lamp (or light) of a display unit is turned on;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
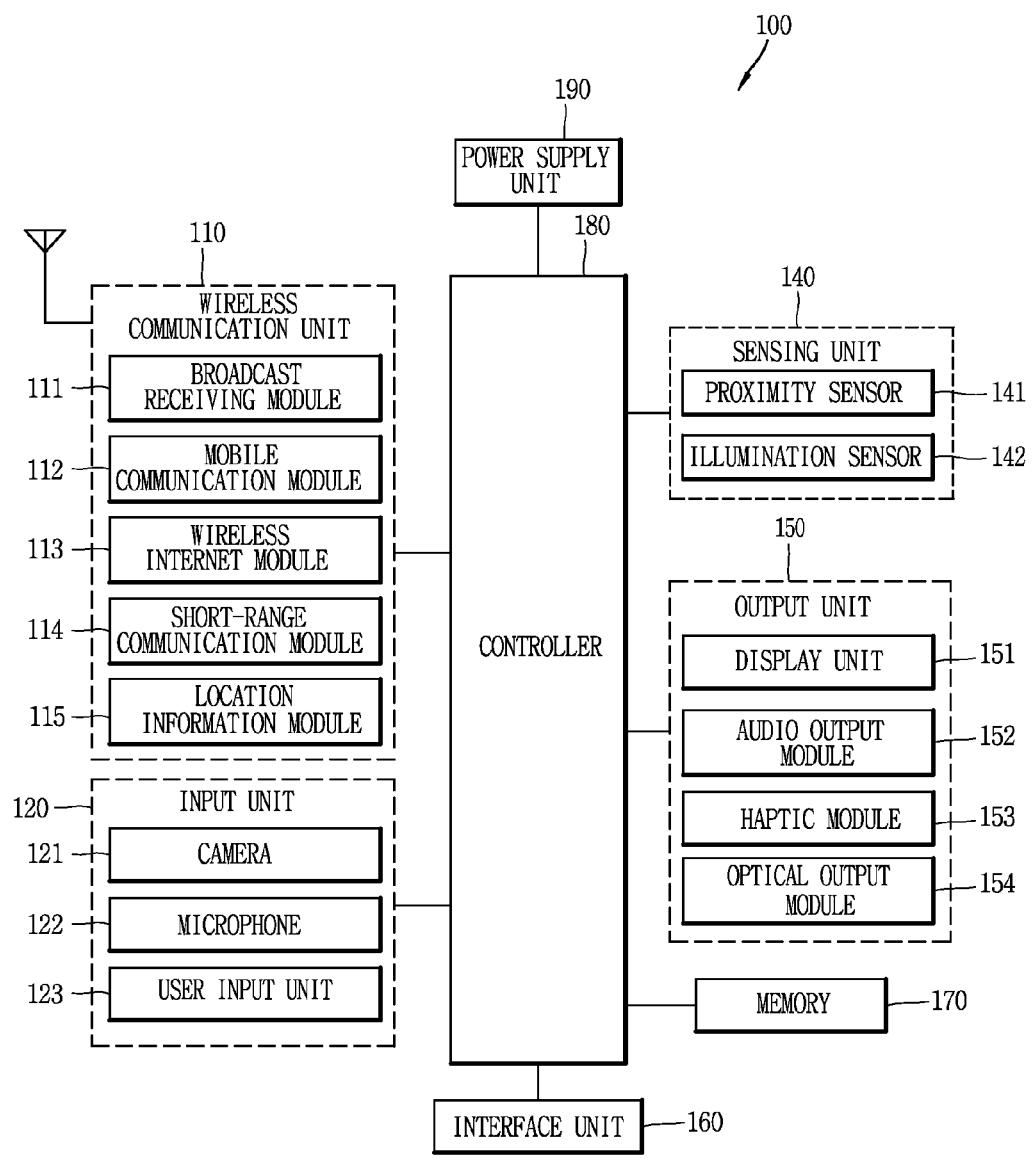
FIG. 1A is a block diagram of a mobile terminal in accordance with one exemplary embodiment of the present invention.
Figure 1B:
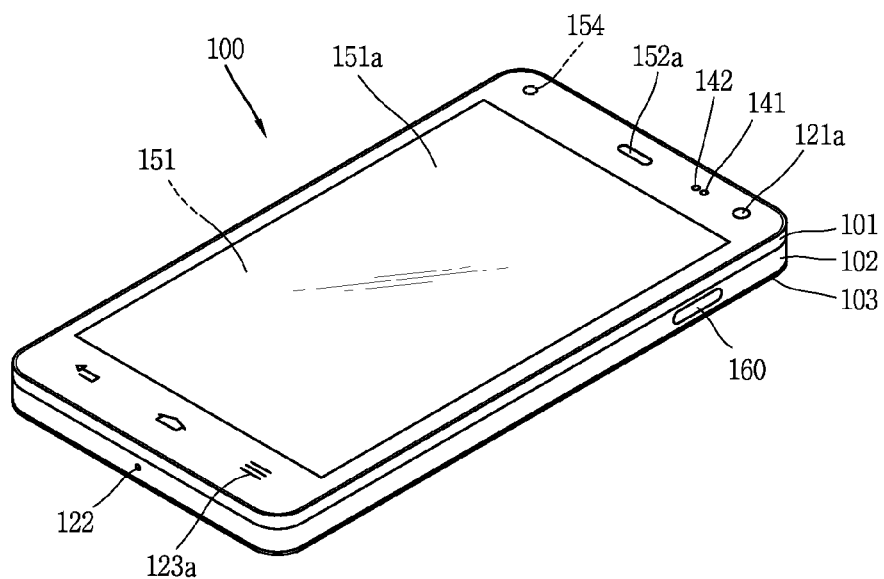
FIGS. 1B and 1C are conceptual views illustrating one example of a mobile terminal, viewed from different directions.

Referring to FIGS. 1A to 10, FIG. 1A is a block diagram of a mobile terminal in accordance with one exemplary embodiment of the present invention, and FIGS. 1B and 10 are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access and may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100.

The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 1C:
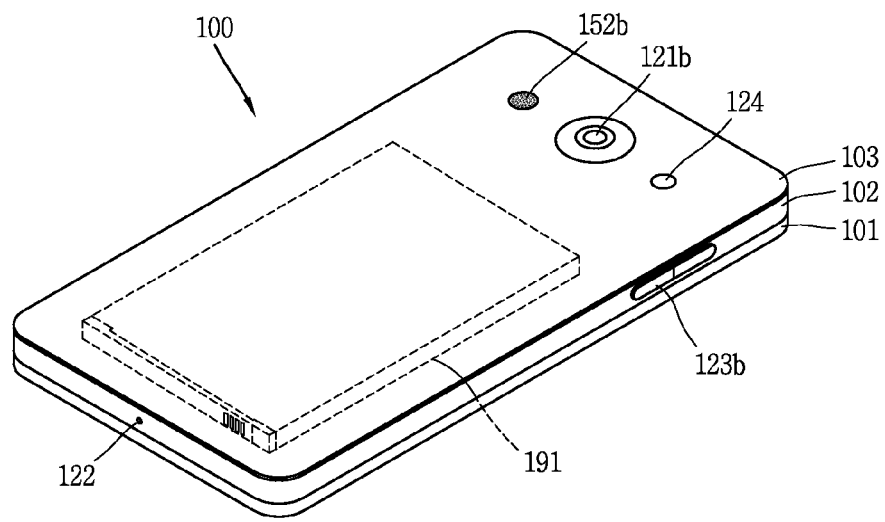

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, considering the mobile terminal 100 as at least one set, the terminal body may be understood as a conception referring to the set.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery, an identification module, a memory card, and the like. A rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the present invention proposes a method of controlling a mobile terminal, in response to preset touches applied to both of a first touch region formed on a front surface of a terminal body and a second touch region formed on a rear surface of the terminal body (the second touch region, in some cases, may be replaced with a touch region formed on the front surface of the terminal body). The first touch region and the second touch region may be included in touch sensors provided at the terminal or a cover coupled to the terminal.

The terminal having the first touch region and the second touch region may be implemented into various forms. Hereinafter, examples of a terminal with first and second touch regions will be described in more detail with reference to the accompanying drawings.

Figure 2A:
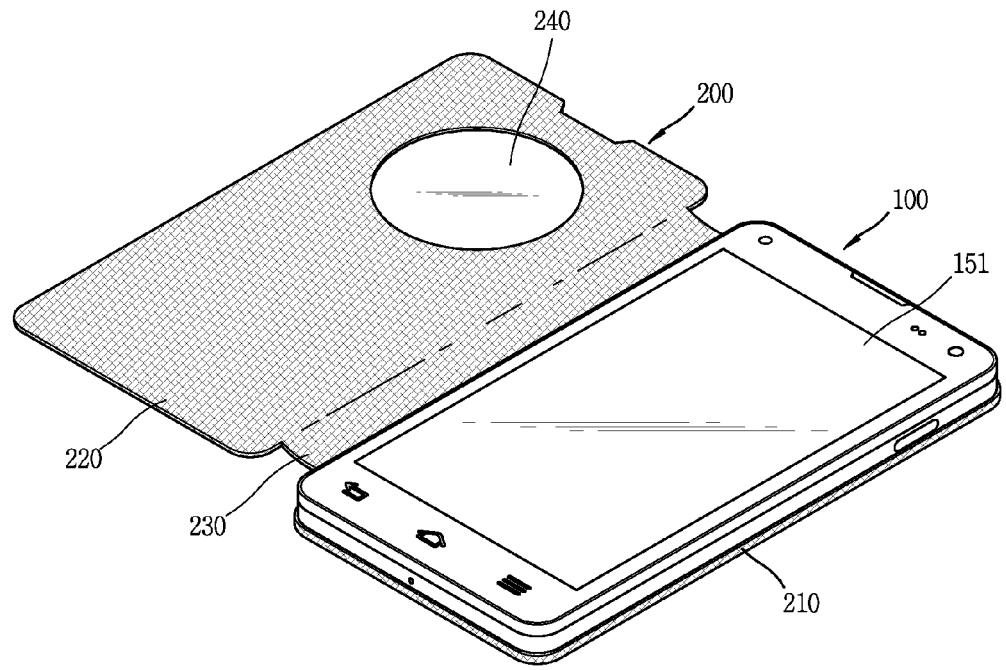
FIGS. 2A to 2C are conceptual views illustrating a mobile terminal accommodated in a cover in accordance with one exemplary embodiment of the present invention.
Figure 2B:
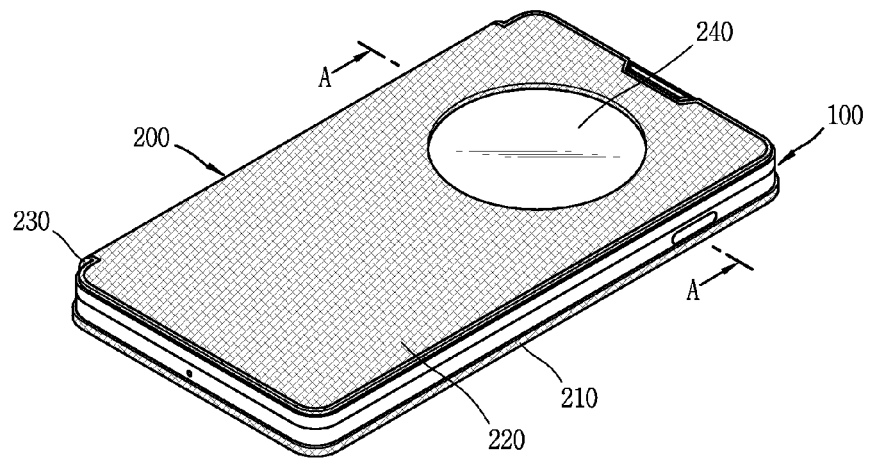
Figure 2C:
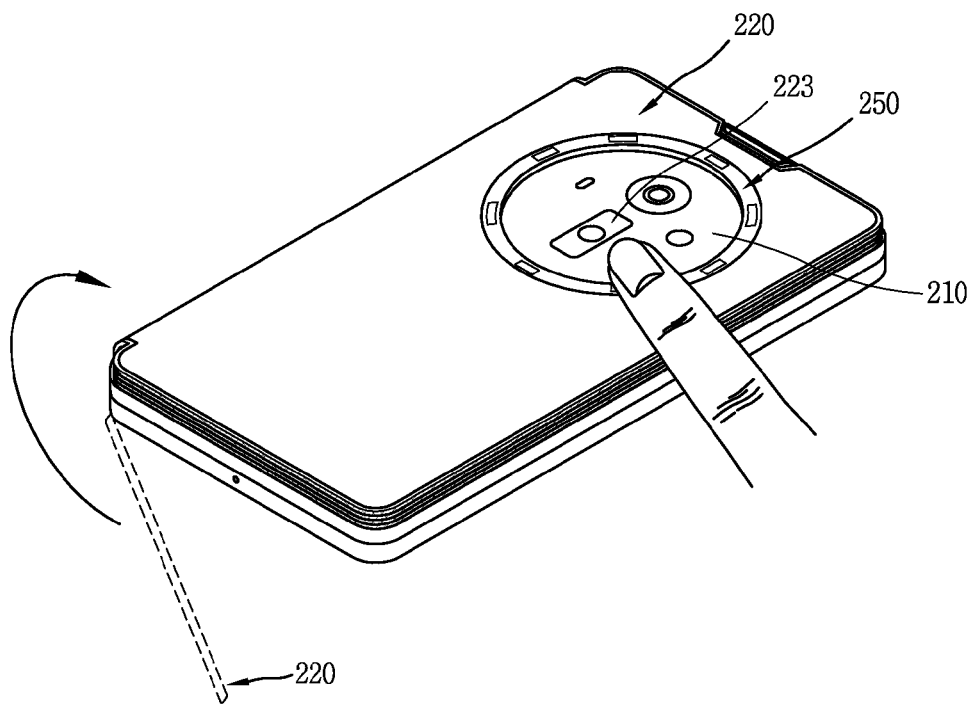

FIGS. 2A, 2B and 2C are conceptual views illustrating a mobile terminal accommodated in a cover in accordance with one exemplary embodiment of the present invention.

Those drawings illustrate that a cover 200 accommodates therein a body of the mobile terminal. FIG. 2A illustrates a state that a front surface of the mobile terminal is open by the cover 200. The open state of the front surface refers to an open state of a display unit 151 disposed on the front surface.

In this instance, the display unit 151 may be configured as a touch screen such that a touch input applied can be sensed. Meanwhile, the display unit 151 may be defined as the first touch region or the second touch region, as aforementioned. For example, the first touch region includes the display unit 151.

The cover 200 includes a rear cover portion 210 at which a rear surface of the terminal body is accommodated. The cover 200 also includes a front cover portion 220 rotatably coupled to the front cover portion 210 so as to close or open the display unit 151.

However, the present invention may not be limited to this. For example, the rear cover portion 210 may be coupled to a side surface other than the rear surface of the body.

Also, the cover 200 may have a structure of replacing a rear cover 103 of the terminal body. In more detail, the cover 200 may be coupled to a rear surface of the mobile terminal, instead of a battery cover, in a mobile terminal coupled with the battery cover. As another example, in a mobile terminal integrally coupled with a battery cover, the cover 200 may be coupled to the mobile terminal with obscuring the battery cover.

As illustrated, a connection portion 230 which connects the rear cover portion 210 and the front cover portion 220 to each other may externally protrude from an edge of the rear cover portion 210.

The connection portion 230 may be integrally formed with the front cover portion 220 and coupled to the rear cover portion 210. In this instance, the connection portion 230 may be made of the same material as the front cover portion 220 and extend from one side of the front cover portion 220.

As another example, the connection portion 230 may be integrally formed with the rear cover portion 210 and coupled to the front cover portion 220. In this instance, the connection portion 230 may be made of the same material as the rear cover portion 210 and extend from one side of the rear cover portion 210.

The connection portion 230 may have a narrow width to be easily bent. The front cover portion 220 may be rotatable to close the display unit 151 using the bendable connection portion 230. FIG. 2B illustrates a state that the cover 200 closes (covers or obscures) the display unit 151 of the mobile terminal.

In the closed state, the mobile terminal 100 and the cover 200 has a shape like a diary, which enhances user's portability. Also, the cover 200 serves as a protection cover for covering the mobile terminal 100, such that the mobile terminal 100 can be protected more safely from external impacts, damages or the like.

The rear cover portion 210 and the front cover portion 220 may be arranged in parallel to each other in the closed state. The connection portion 230 may be formed to obscure a part of a gap formed between the rear cover portion 210 and the front cover portion 220. In this instance, the rest of the gap may be filled by providing a cover side portion.

In the drawings, the cover 200 is configured to externally expose visual information on the display unit 151 in the state of closing the display unit 151. More specifically, referring to FIG. 2B, the front cover portion 220 may be provided with a window portion 240. The window portion 240 may be made of a light-transmittable member. The light-transmittance of the window portion 240 allows visual information of the display unit 151 to be output on an outer surface of the window portion 240.

The window portion 240 overlaps the display unit 151 to output the visual information. In more detail, the window portion 240 may be located on the front surface of the display unit 151 while the front cover portion 220 closes the display unit 151. With this structure, a user can view from outside icons, text, images and the like output on the display unit 151 through the window portion 240.

Also, the terminal according to the present invention can sense a user motion applied to an inner side of the window portion 240 and control its operation based on the sensed user motion. In addition, the terminal according to the present invention may sense a user motion with respect to the inner side of the window portion 240 while the front cover portion 220 closes the rear surface 103 of the terminal or the front cover portion 220 is rotated to overlap the rear cover portion 210. FIG. 2C illustrates a state that the front cover portion 220 is rotated to cover the rear surface 103 of the terminal from the state illustrated in FIG. 2A or 2B.

While the front cover portion 220 closes the rear surface 103 of the terminal, in order to sense the user motion applied to the inner side of the window portion 240 at the rear surface 103 of the terminal, the cover 200 is provided with a sensor unit 250. The sensor unit 250 is provided with at least one sensor 251 disposed at an edge portion of the window portion 240. The sensor 251 is configured to sense a user motion with respect to the inner side of the window portion 240, and may be an infrared sensor, a laser sensor or a photo sensor. Thus, the sensor unit 250 may sense the user motion with respect to the inner side of the window portion 240 while the front cover portion 220 closes the rear surface of the terminal body.

Meanwhile, a portion of the rear surface 103 of the terminal, which corresponds to the inner side of the window portion 240, may be defined as the aforementioned first or second touch region. As an example, the second touch region includes the portion of the rear surface 103 of the terminal, corresponding to the inner side of the window portion 240.

The structure, as illustrated in FIG. 2C, may allow for sensing a touch applied simultaneously to the first touch region and the second touch region. Therefore, in response to preset touches which are applied to both of (or simultaneously to) the first touch region and the second touch region, various control methods for controlling the terminal may be enabled.

Also, the structure of sensing the touches simultaneously applied to the first touch region and the second touch region may be implemented into various forms. As one of those forms, a mechanism using a flexible display may be exemplarily illustrated, which will be described in more detail hereinafter.

Figure 3A:
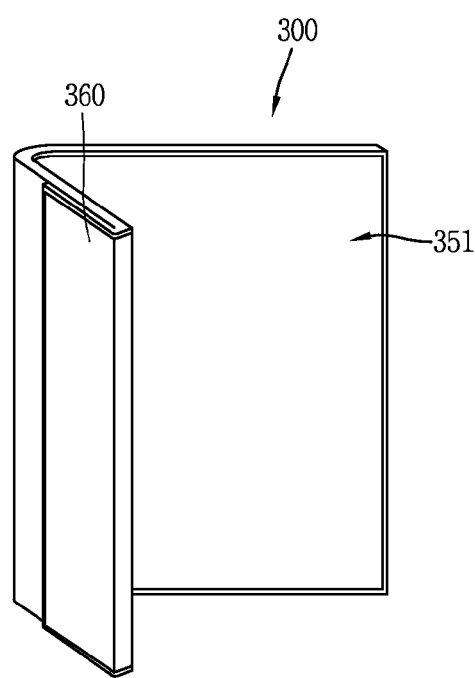
FIGS. 3A to 3C are conceptual views illustrating a mobile terminal in accordance with another exemplary embodiment of the present invention.
Figure 3B:
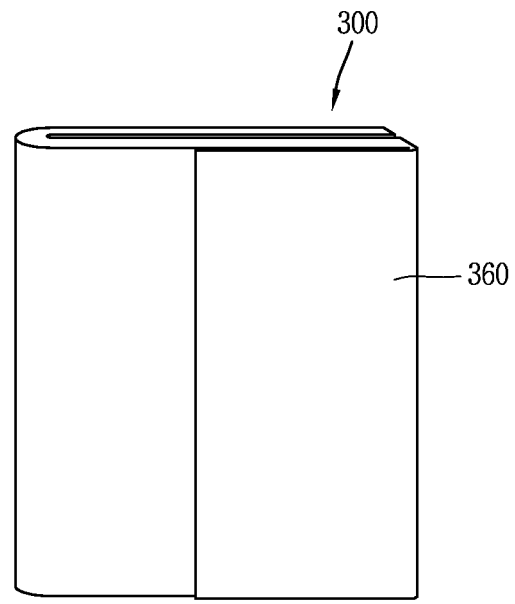
Figure 3C:
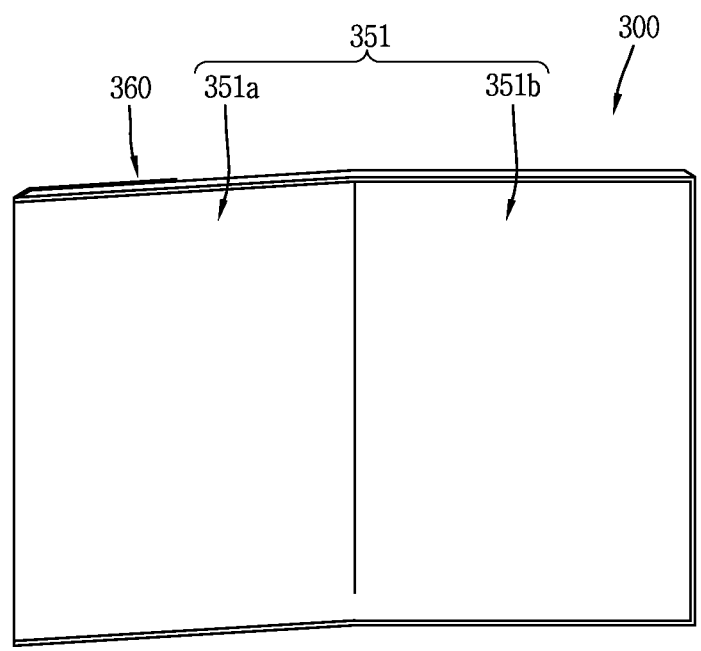

FIGS. 3A to 3C are conceptual views illustrating a mobile terminal in accordance with another exemplary embodiment of the present invention.

FIG. 3A is a conceptual view illustrating an example in which a display unit forms a single plane in a mobile terminal according to the present invention, FIG. 3B is a conceptual view illustrating a state while the mobile terminal illustrated in FIG. 3A is bent or folded, and FIG. 3C is a conceptual view illustrating a state that the mobile terminal illustrated in FIG. 3A has completely been bent or folded.

As illustrated in FIGS. 3A to 3C, a mobile terminal 300 includes a flexible display unit 351 disposed on a front surface of a case defining appearance of the terminal, and a sensing unit 140 (see FIG. 1, or a transformation sensing module) sensing a transformation (or a change in shape) of the flexible display unit 351.

The flexible display unit 351 is bendable or foldable. Also, the flexible display unit 351 may be configured as a touch screen to sense a touch input applied thereto.

Here, "folding" refers to a state that a radius of curvature of a part at a body of the mobile terminal 300 is kept smaller than a reference value, in plain words, corresponds to a folded state. Upon folding a display unit, folded screens of the display unit come in contact with each other or are located close to each other. On the other hand, "bending" refers to a state that a radius of curvature of a part at the body of the mobile terminal 300 is kept greater than the reference value, in plain words, corresponds to a bent state.

Referring to FIGS. 3A to 3C, while the flexible display unit 351 of the mobile terminal 300 forms a single plane, at least part of the flexible display unit 351 is changed in shape (i.e., transformed). The shape-changed state, for example, may correspond to a state that the flexible display unit 351 is folded. That is, the flexible display unit 351 may be configured to be converted into a first state (see FIG. 3A) where a specific area thereof is planar, and a second state (see FIG. 3C) where the specific area is bent into a curved surface.

However, the present invention may not be limited to this, and the flexible display unit 251 may include a plurality of specific areas. In this instance, left and right ends of the body of the mobile terminal 300 may be folded to provide a dual foldable display.

Referring to FIG. 3C, the flexible display unit 351 may include a first area 351a and a second area 351b which are divided by a boundary of a central portion in the first state.

The first area 351a may be an area located at one side of the flexible display unit 351 and the second area 351b may be an area located at another side of the flexible display unit 351, on the basis of the boundary.

The first area 351a and the second area 351b are areas where different types of information are displayed, and may be divided by having different types of GUIs from each other. For example, execution screens of different applications may be output on the first area 351a and the second area 351b, respectively. As another example, a home screen page may be output on one of the first area 351a and the second area 351b and an execution screen of an application may be output on the other. However, the present invention may not be limited to this. The first area 351a and the second area 351b may output one execution screen in a dividing manner.

In this instance, the first area 351a and the second area 351b may be defined as the aforementioned first touch region and second touch region. This may enable a control of the terminal using touches simultaneously applied to the first touch region and the second touch region in the first state.

Referring to FIGS. 3B and 3C, the mobile terminal 300 may include a touch-sensitive area 360 on a rear surface of a case forming appearance thereof. In this instance, the first area 351a and the second area 351b of FIG. 3A may be defined as the first touch region, and the touch-sensitive area 360 on the rear surface may be defined as the second touch region.

For example, the touch-sensitive area 360 of the mobile terminal 300 may be bent or transformed by being rotated in a first direction (a rotating direction that the first area 351a and the second area 351b face each other) centering on the specific area as an axis.

The touch-sensitive area 360 of the rear surface may be a touch screen. In this instance, the second touch region may be a display unit outputting visual information. As another example, the second touch region may be provided with a touch pad or touch sensor, which receives a touch input, without an output of visual information. As another example, the touch-sensitive area 360 of the rear surface may be implemented as a transparent display unit. In more detail, the second touch region may be configured to be transparent such that visual information output on the front flexible display unit 351 can be seen through the second touch region.

With the structure, touches applied simultaneously to the first touch region and the second touch region can be sensed. This may enable many methods of controlling the terminal, in response to preset touches applied simultaneously to the first touch region and the second touch region.

Figure 4:
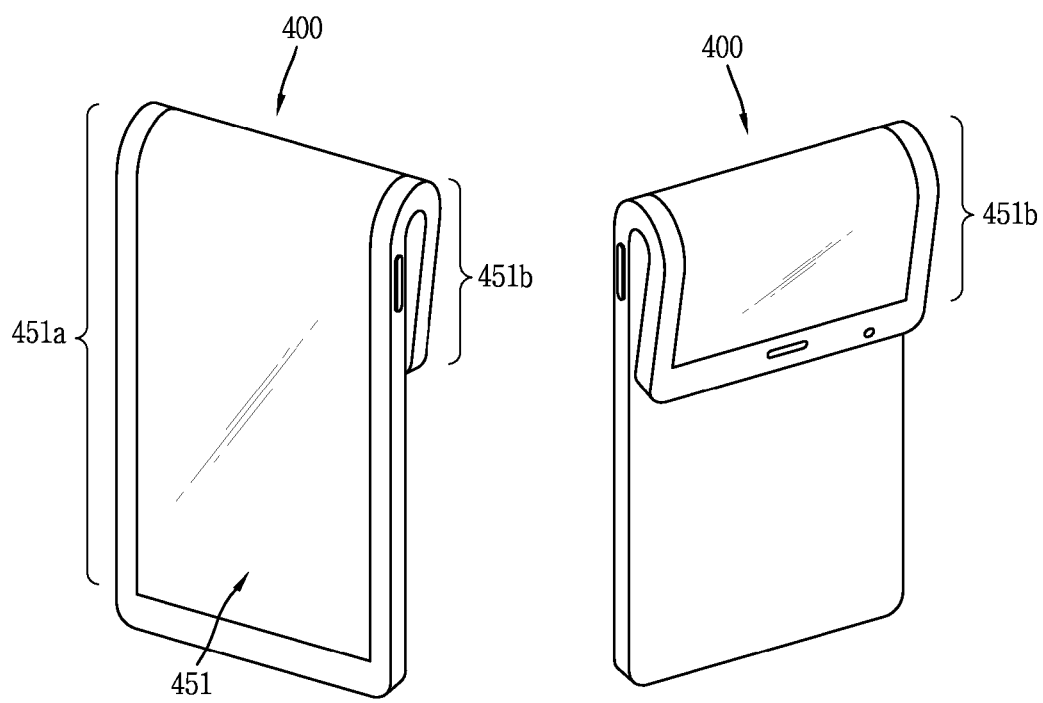
FIG. 4 is a conceptual view illustrating a mobile terminal in accordance with another exemplary embodiment of the present invention.

The mechanism using the flexible display may also be varied into a different form. FIG. 4 is a conceptual view illustrating a mobile terminal in accordance with another exemplary embodiment.

As illustrated in FIG. 4, a flexible display unit 451 of a mobile terminal 400 may be bent or transformed by being rotated in a second direction, opposite to the first direction, centering on a specific area (a folded portion) as an axis.

In this instance, the flexible display unit 451 may include a first area 451a and a second area 451b which are divided based on the specific area. The first area 451a may be an area located at one side of the flexible display unit 451 and the second area 451b may be an area located at another side of the flexible display unit 451, on the basis of the specific area.

Here, the specific area may be located at a position closer to another end than to one end of a body of the mobile terminal 400. Therefore, the first area 451a and the second area 451b may be configured in different sizes from each other.

The first area 451a and the second area 451b may be areas where different types of information are displayed, and may be divided by having different types of GUIs from each other. For example, execution screens of different applications may be output on the first area 451a and the second area 451b, respectively. As another example, a home screen page may be output on one of the first area 451a and the second area 451b and an execution screen of an application may be output on the other. However, the present invention may not be limited to this. The first area 451a and the second area 451b may output one execution screen in a dividing manner.

In this instance, the first area 451a and the second area 451b may be defined as the aforementioned first touch region and second touch region. This may enable a control of the terminal using touches simultaneously applied to the first touch region and the second touch region.

The foregoing description has been given of those various forms of terminals having a plurality of touch regions. Hereinafter, description will be given of various control methods for a terminal, in response to preset touches applied simultaneously to a first touch region and a second touch region. The control methods to be explained hereinafter may be applied to each of those various forms of terminals illustrated with reference to FIGS. 2A to 4, and also applied to other types of terminals if it has a first touch region and a second touch region.

Figure 5:
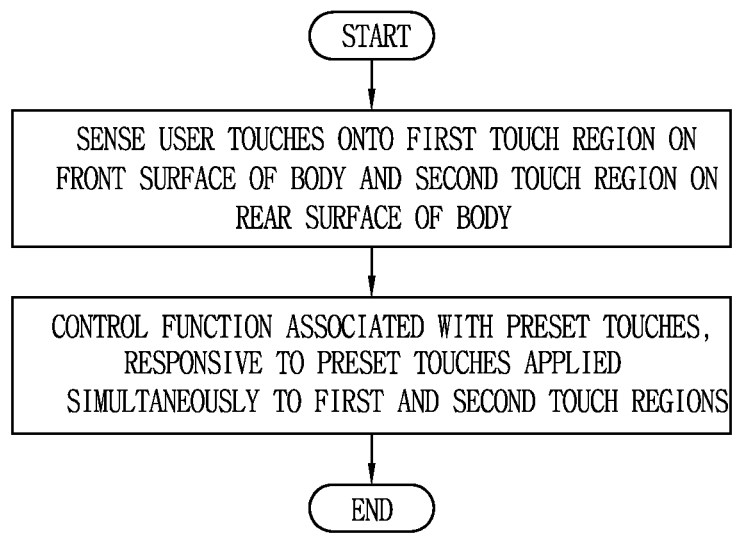
FIG. 5 is a flowchart illustrating a control method in accordance with the present invention.

Hereinafter, description will be given of a method of controlling a terminal with the foregoing configuration, in response to touches applied simultaneously to a first touch region and a second touch region, with reference to the accompanying drawing. FIG. 5 is a flowchart illustrating a control method in accordance with the present invention.

A mobile terminal according to the present invention is controlled based on touches applied simultaneously to first and second touch regions. In this instance, a controller may perform various controls according to i) a type of touch (or a type of user motion) applied to the first and second touch regions, ii) a touch position, iii) a type of screen output on a display unit at the moment that touches are applied to the first and second touch regions, iv) a turn-on/off of the display unit at the moment that touches are applied to the first and second touch regions.

In more detail, according to the present invention, the control method includes sensing touches applied to a first touch region (or a first area 610) and a second touch region (or a second area 620) (S510). In the step S510, touches applied simultaneously to the first and second touch regions 610 and 620 are sensed. In the step S510, even though the touches applied to the first and second touch regions 610 and 620 are not simultaneous-applied touches, touches which are applied to the first and second touch regions 610 and 620 with a time interval, which is short enough to be determined as being applied substantially at the same time, can also be recognized as the simultaneously-applied touches.

Meanwhile, as illustrated in FIGS. 2A to 2C, when a user motion applied to the rear surface of the terminal is sensed by a sensor provided at a cover, it may be understood that the user motion has been applied, instead of a user touch. That is, this specification generally describes that it is determined whether or not touches have been applied to the first and second touch regions, but it can be obvious to those skilled in the art that the term 'touch' can be replaced with 'user motion.' Also, in this instance, the expression 'touch region' may also be understood as a meaning of 'an area where a user motion is sensed,' or 'an area,' namely, an area to which a user motion other than a touch is applied.

Meanwhile, the controller 180 senses a case where preset touches are applied simultaneously to the first and second touch regions 610 and 620.

Here, the preset touches may vary. For example, the preset touch may be a preset number of tap touches (or short touches). As another example, the preset touch may be a long touch which is maintained for a preset time, a drag touch moved in a specific direction, a flick touch, a sliding touch, a swipe touch and the like.

Meanwhile, in the step S510, when the preset touches are applied simultaneously to the first and second touch regions 610 and 620, a control of the terminal is carried out (S520). In the present invention, there may be various controls which are carried out in response to the preset touches simultaneously applied to the first and second touch regions 610 and 620.

The controller 180 may perform a specific function pre-associated with a type of an applied touch, in response to touches being applied simultaneously to the first and second touch regions 610 and 620, or a specific function pre-associated with positions of touches applied to the first and second touch regions 610 and 620. Here, the function performed in response to the touches applied to the first and second touch regions 610 and 620 may be set or changed based on a user selection, and also predecided when a terminal is produced by a terminal manufacturer.

Meanwhile, the controller 180 may perform a different function, on the basis of touches applied simultaneously to the first and second touch regions 610 and 620, according to whether a lamp (light) of the display unit 151 is in a turn-on or turn-off state.

For example, when the lamp of the display unit 151 is in a turn-off state, the controller 180 may perform a preset function, based on at least one of a position at which touches are applied to the first and second touch regions 610 and 620, and a type of such touches. That is, in this instance, different types of functions may be matched in association with at least one of a touch-applied position or a touch type.

As another example, when the lamp of the display unit 151 is in a turn-on state, the controller 180 may perform a specific function based on screen information output on the display unit, responsive to preset touches being applied simultaneously to the first and second touch regions 610 and 620. In this instance, the controller 180 may perform a different function or control on the basis of a type of the screen information, a content of the screen information, a type of application corresponding to the screen information, and the like.

As described above, in the mobile terminal according to the present invention, the control of the terminal is performed responsive to touches applied simultaneously to the first and second touch regions 610 and 620. Meanwhile, different controls are performed when a preset touch is applied to one of the first and second touch regions 610 and 620 and when touches are applied simultaneously to the first and second touch regions 610 and 620. For example, the controller 180 may perform a control associated with information output on an area corresponding to a touch-applied position, in response to the touch applied to one of the first and second touch regions 610 and 620. On the other hand, the controller 180 may perform a control, irrespective of information output on the display unit 151 or information output on an area corresponding to a touch-applied position, in response to touches applied simultaneously to the first and second touch regions 610 and 620.

Therefore, the mobile terminal according to the present invention may receive more various user control commands by utilizing touches simultaneously applied to the first and second touch regions 610 and 620.

Hereinafter, description will be given in more detail of various examples of controlling the terminal, in response to touches applied to the first and second touch regions 610 and 620, with reference to the accompanying drawings.

FIGS. 6A to 6C and 7A to 7C are conceptual views illustrating the control method illustrated in FIG. 5.

As aforementioned, the mobile terminal according to the present invention performs a preset function, in response to touches applied simultaneously to the first and second touch regions 610 and 620.

Figure 6A:
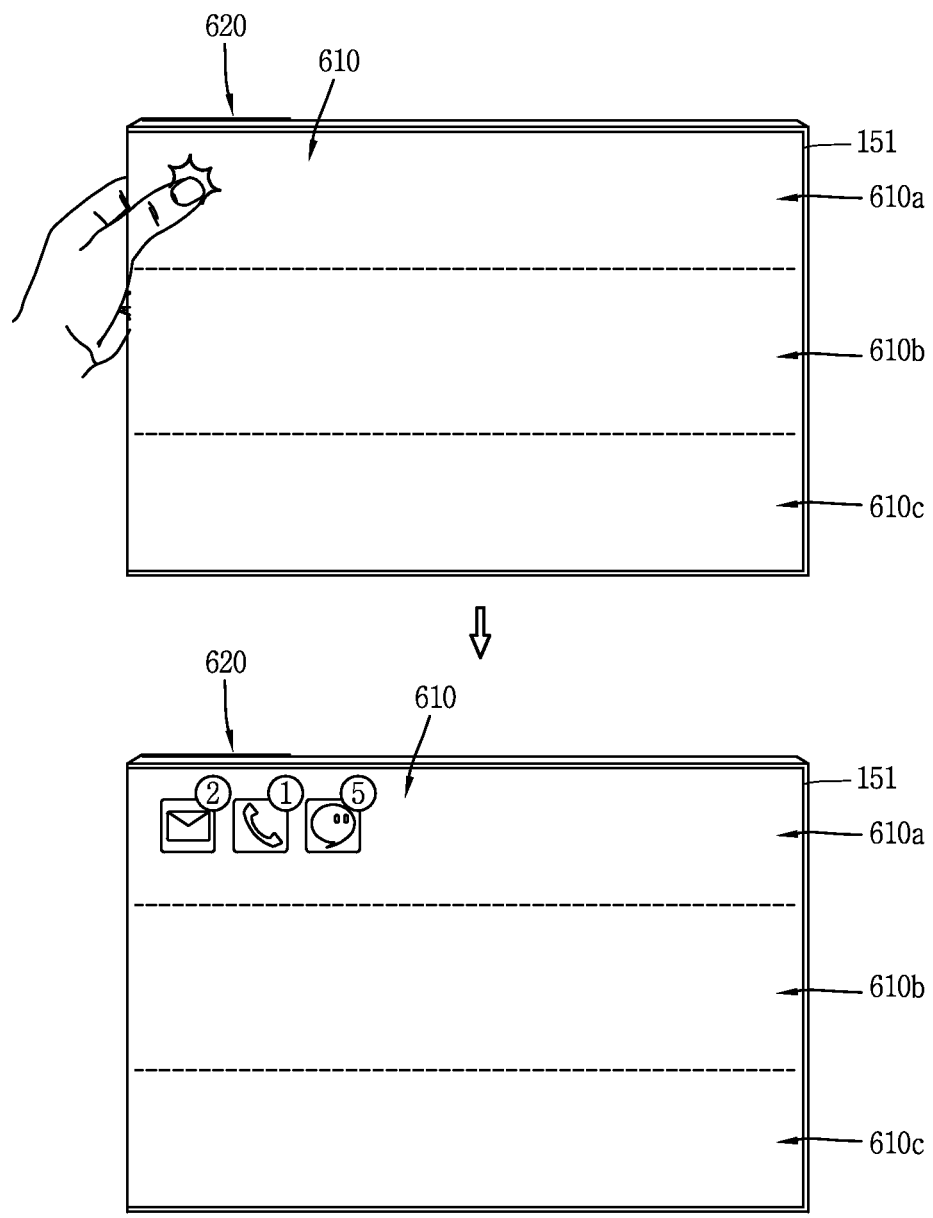
FIGS. 6A to 6C and 7A to 7C are conceptual views illustrating the control method illustrated in FIG. 5.

In this instance, even though the light of the display unit 151 is in an off state as illustrated in a first drawing of FIG. 6A, the controller 180, as illustrated in the second drawing of FIG. 6A, may turn the light of the display unit 151 on in response to touches applied simultaneously to the first and second touch regions 610 and 620, so as to output screen information corresponding to a preset function on the display unit 151. Here, the preset function may be notification information related to applications from which events have been generated. In this instance, the notification information may be icons of event-generated applications. When one of the output icons is selected, an application corresponding to the selected icon may be executed or screen information related to a preset application may be output on the display unit. Here, event-related information may preferentially be output on the display unit 151.

Meanwhile, the controller 180 may perform a different function or output different screen information according to a touch-applied position on the display unit 151. That is, the controller 180 may output different screen information according to a touch position at which touches are applied simultaneously to the first and second touch regions 610 and 620.

Figure 6B:
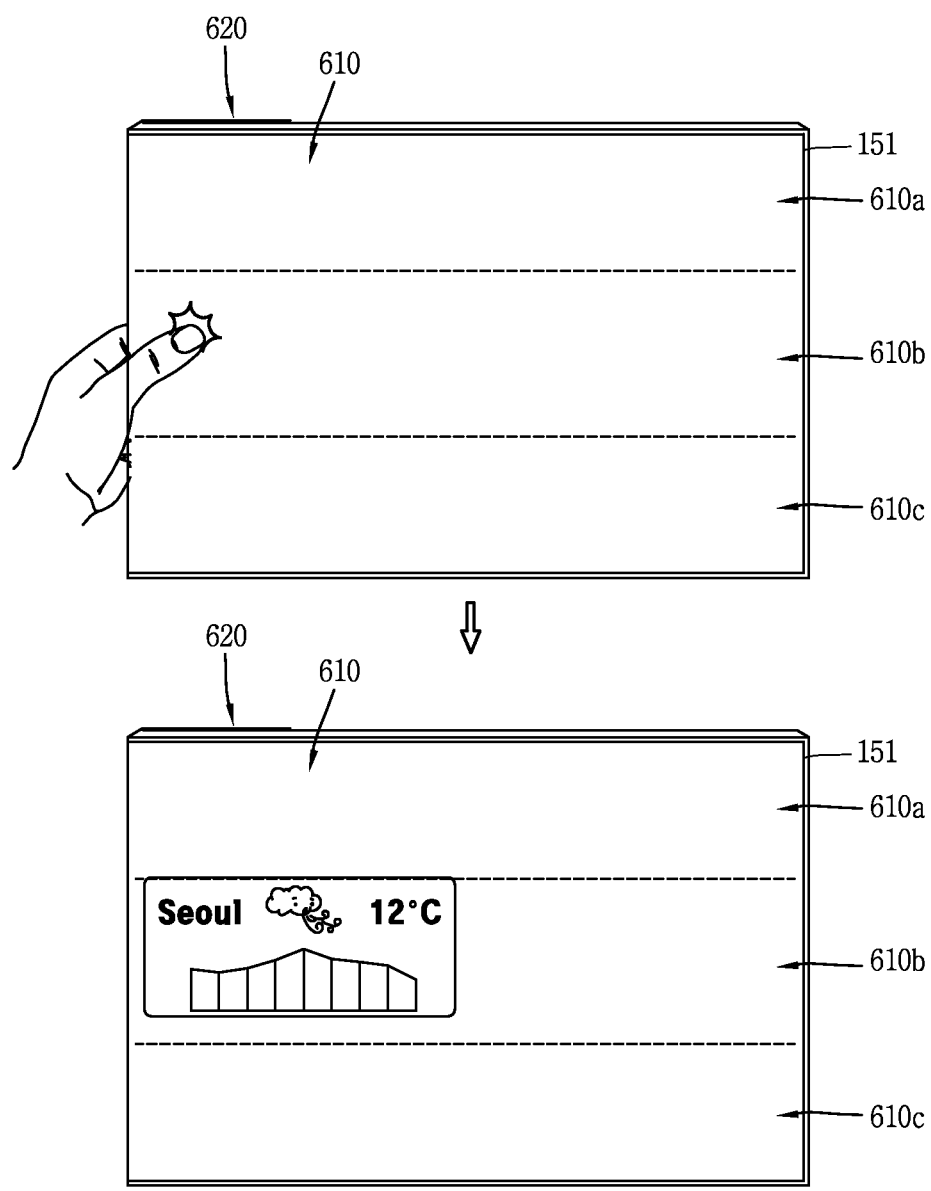
Figure 6C:
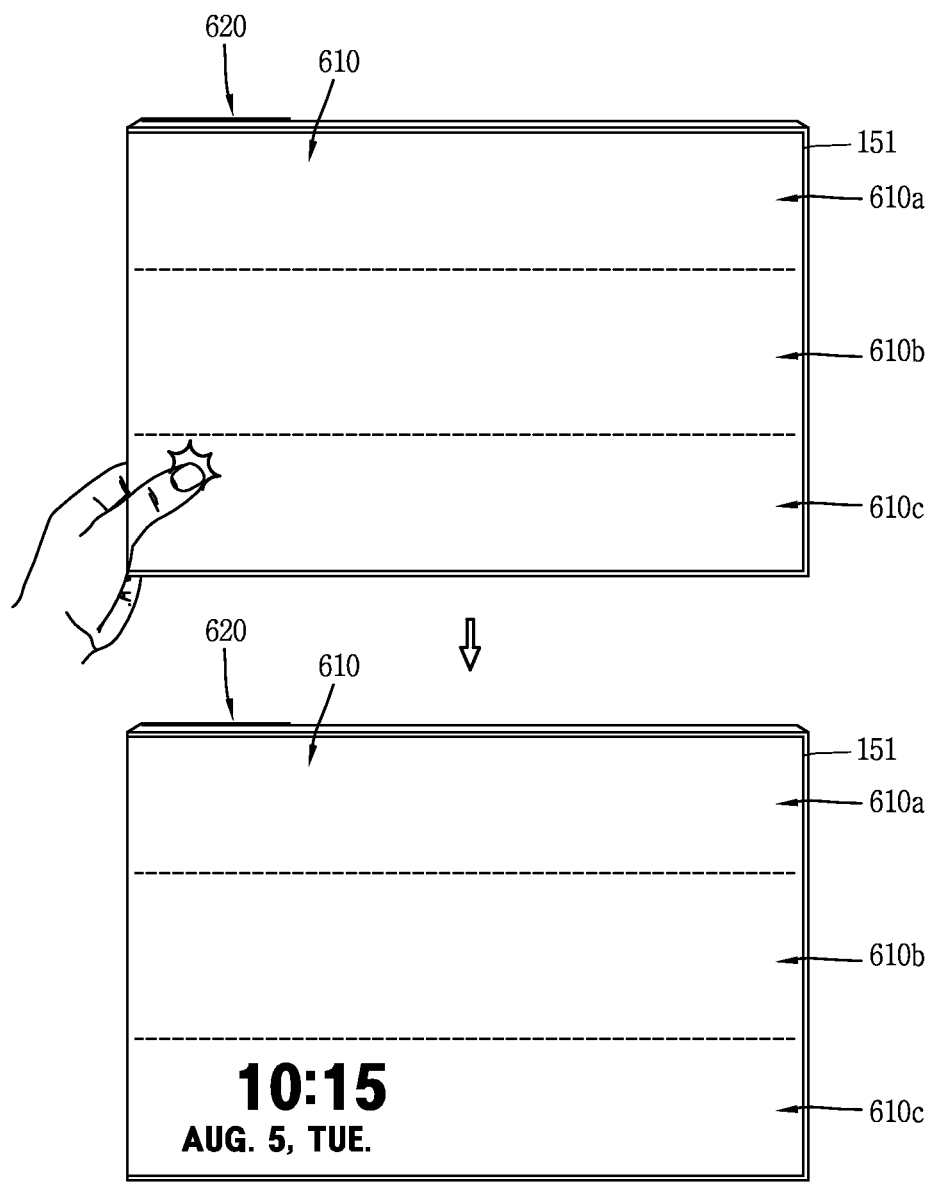

For example, as illustrated in FIGS. 6A to 6C, the display unit 151 may be divided into a plurality of areas, namely, first to third areas 610a, 610b and 610c. The controller 180, as illustrated in FIGS. 6A to 6C, may output different screen information according at which area of the first to third areas 610a, 610b and 610c has received the touches applied simultaneously to the first and second touch regions 610 and 620.

In this instance, the controller 180 may output screen information only on an area corresponding to a touch-applied position. For example, as illustrated in FIG. 6A, when touches are applied simultaneously to the first and second touch regions 610 and 620, corresponding to (i.e., within) the first area 610a, the controller 180 may output screen information on at least part of the first area 610a. In this instance, the turn-off state of the light of the display unit 151 may be maintained on the rest area except for the at least part of the first area 610a. That is, the controller 180 may partially turn on or off the light of the display unit 151.

As another example, as illustrated in FIG. 6B, when touches are applied simultaneously to the first and second touch regions 610 and 620, corresponding to (within) the second area 610b, the controller 180 may output screen information on at least part of the second area 610b. In this instance, the turn-off state of the light of the display unit 151 may be maintained on the rest area except for the at least part of the second area 610b. That is, the controller 180 may partially turn the light of the display unit 151 on or off. Meanwhile, the screen information output on the second area 610b may be weather information or information relating to a weather widget.

As another example, as illustrated in FIG. 6C, when touches are applied simultaneously to the first and second touch regions 610 and 620, corresponding to (within) the third area 610c, the controller 180 may output screen information on at least part of the third area 610c. In this instance, the turn-off state of the light of the display unit 151 may be maintained on the rest area except for the at least part of the third area 610c. That is, the controller 180 may partially turn the light of the display unit 151 on or off. Meanwhile, the screen information output on the third area 610c may be current time information or information relating to a time widget.

In the meantime, in the mobile terminal according to the present invention, as illustrated in FIGS. 6A to 6C, while screen information is output in response to preset touches being applied simultaneously to the first and second touch regions 610 and 620, when an additional touch is applied to the display unit 151, information related to the previously-output screen information may additionally be output. Here, the related information may be detailed information corresponding to the previously-output screen information, or an execution screen of a specific function or specific application associated with the previously-output screen information.

Figure 7A:
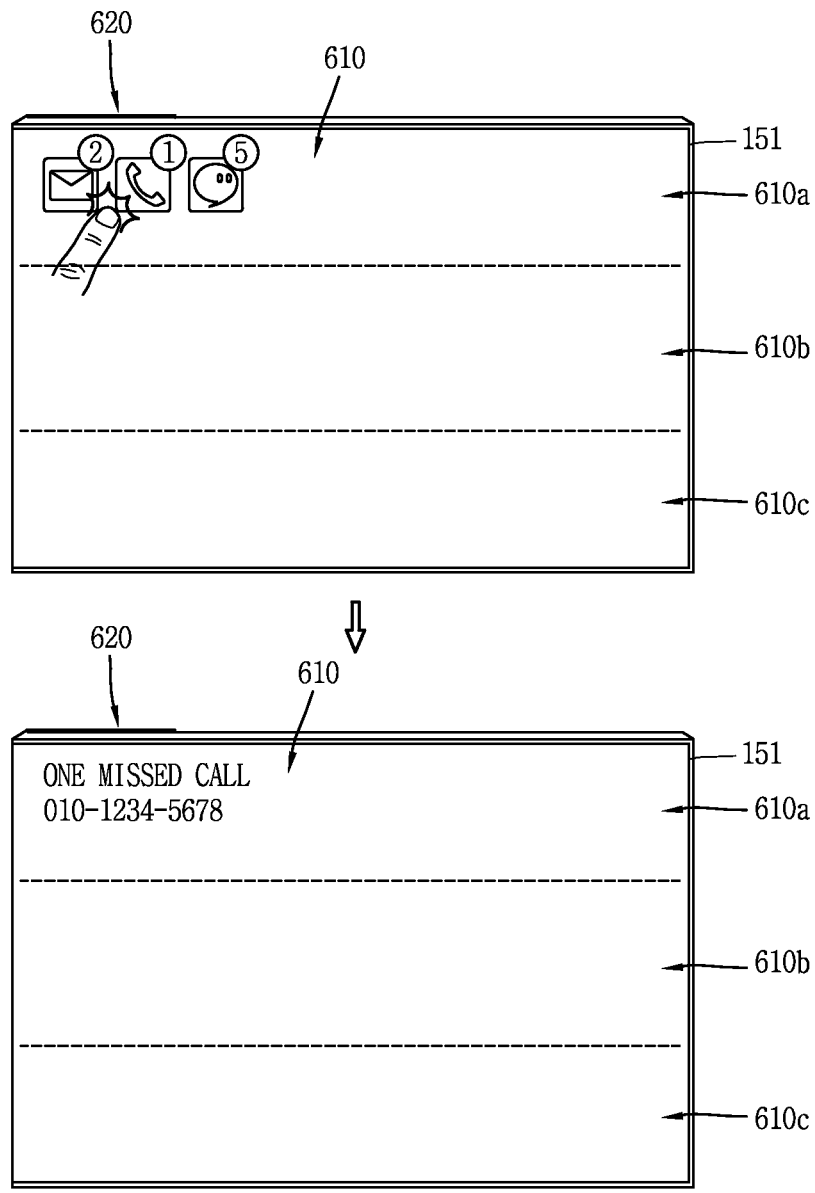

For example, as illustrated in FIG. 6A and a first drawing of FIG. 7A, screen information corresponding to a preset function (e.g., notification information related to event-generated applications) may be output on the display unit 151, in response to touches applied to the first and second touch regions 610 and 620. In this instance, the notification information may be icons of the event-generated applications. When one of the icons is selected, the controller 180, as illustrated in a second drawing of FIG. 7A, may output detailed information corresponding to the selected icon, or execute an application corresponding to the selected icon. Here, event-related information may preferentially be output on the display unit 151.

In addition, the detailed information or the execution screen, as aforementioned in FIG. 6A, may be output within the first area 610a or fully or partially on the display unit 151.

Figure 7B:
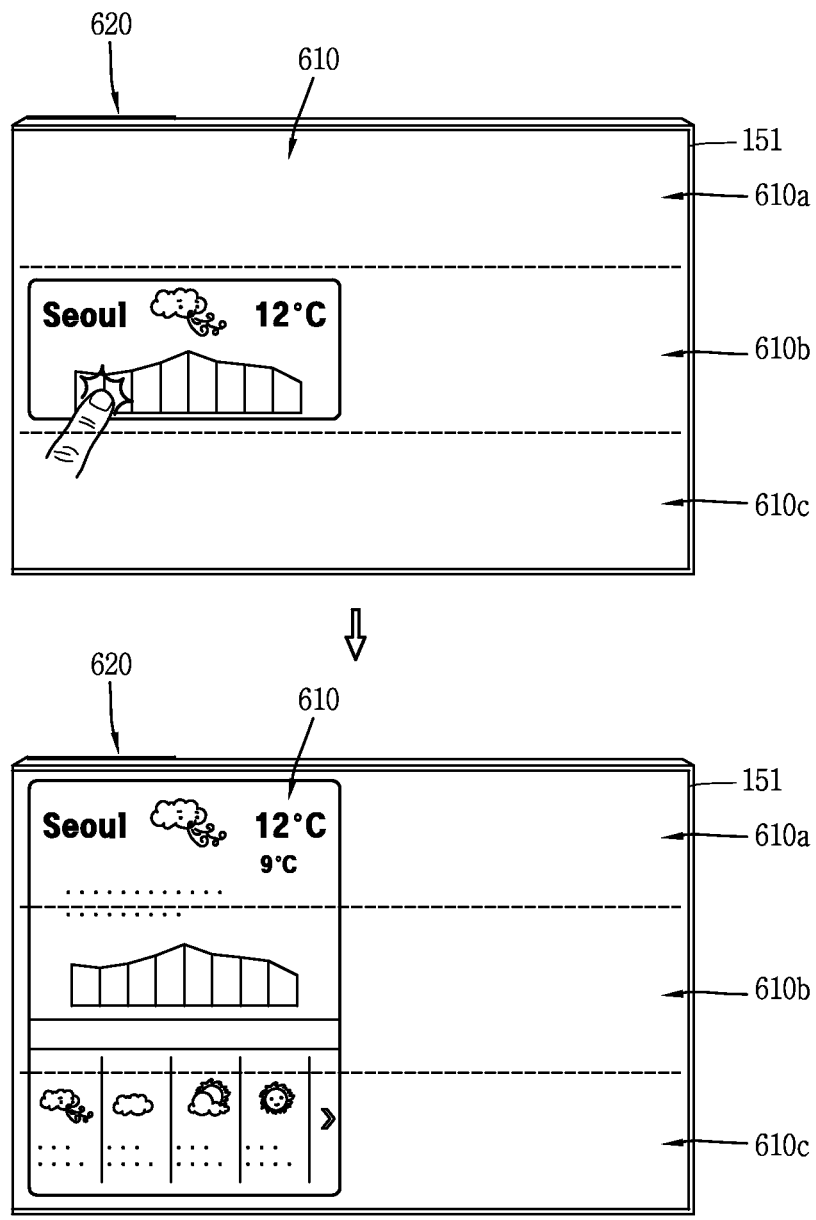
Figure 7C:
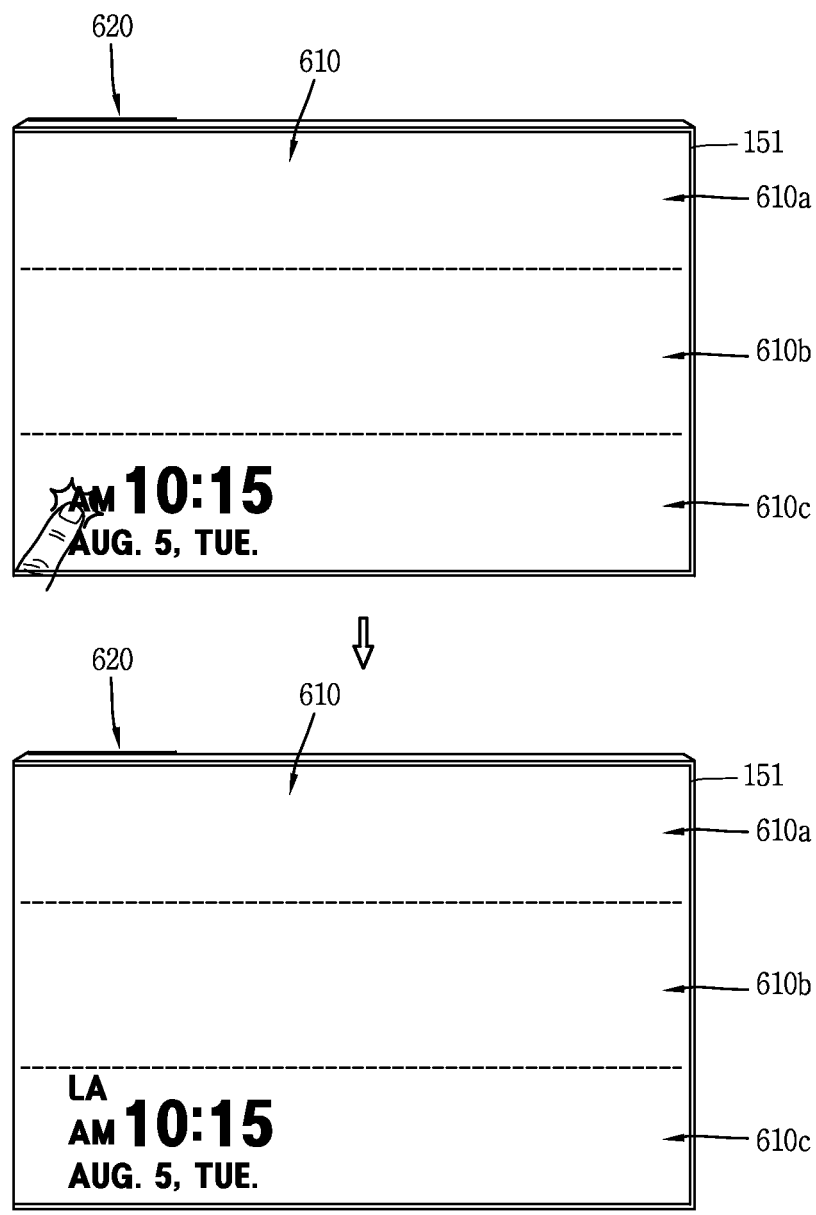

On the other hand, referring to FIGS. 7B and 7C, when a preset touch is applied to screen information output on the second area 610b or the third area 610c as described in FIG. 7A, information (or detailed information) related with the previously-output screen information may be output on the display unit 151 fully or partially.

As described above, in the mobile terminal according to the present invention, in a turn-off state of the light of the display unit 151, screen information may be output in response to preset touches applied simultaneously to the first and second touch regions 610 and 620. This may allow the user to turn the light of the display unit on and also receive screen information through an intuitive touch.

FIGS. 8A, 8B, 9A, 9B, 10A and 10B are conceptual views illustrating a method of performing various controls for a mobile terminal, using touches applied simultaneously to a first touch region and a second touch region, in the mobile terminal in accordance with the present invention.

In the present invention, while an arbitrary function is executed in the terminal, when touches are applied simultaneously to the first and second touch regions 610 and 620 in an off state of the display unit 151 due to a user request or a lapse of a turn-on time of the display unit 151, information related to a function which has been executed before the display unit is turned off may be output.

For example, as illustrated in a first drawing of FIG. 8A, while a specific function or a specific application (for example, a video application) is executed, the display unit 151 is turned off. When preset touches are applied simultaneously to the first and second touch regions 610 and 620 as illustrated in a second drawing of FIG. 8A, the controller 180, as illustrated in a third drawing of FIG. 8A, may output information 810 related to the specific function or specific application on the display unit 151. That is, the controller 180 may output on the display unit 151 information related to a function or application associated with screen information, which has been output on the display unit 151 before the display unit 151 is turned off.

On the other hand, as illustrated in fourth and fifth drawings of FIG. 8A, in the information-output state, the controller 180 may re-output an execution screen of the specific function or specific application or another information irrelevant to the specific function or specific application, according to a type of touch applied to the display unit 151.

For example, when a preset number of tap touches are applied to the information 810, the controller 180 may output the execution screen of the specific function or specific application. When a drag touch (a swipe touch or a sliding touch) starting from the area where the information 810 is output is applied, the controller 180 may output another information (for example, a home screen page) irrelevant to the specific function or specific application.

Meanwhile, in the turn-off state of the display unit 151, when preset touches are applied simultaneously to the first and second touch regions 610 and 620 and an additional touch is applied, the controller 180 may switch a lock state into an unlock state.

That is, information illustrated in the fourth and fifth drawings of FIG. 8A may be information output in the unlock state. The controller 180 may control the display unit 151 to output the information illustrated in the fourth and fifth drawings of FIG. 8A, only in response to a touch applied to the area on which the information 810 is output. That is, the controller 180 may perform a control, only responsive to a touch applied to an information-output area.

Figure 8B:
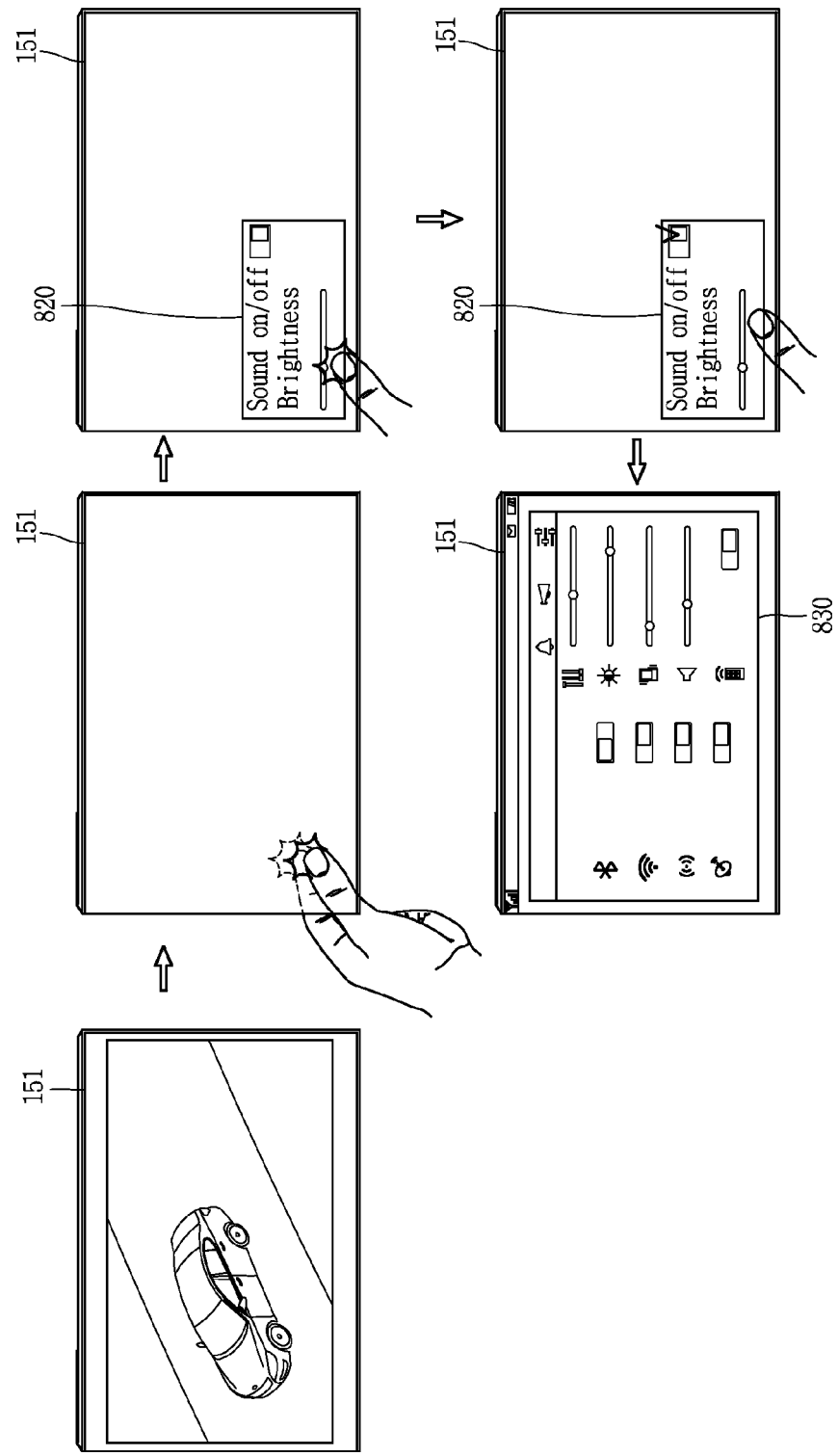
Figure 9A:
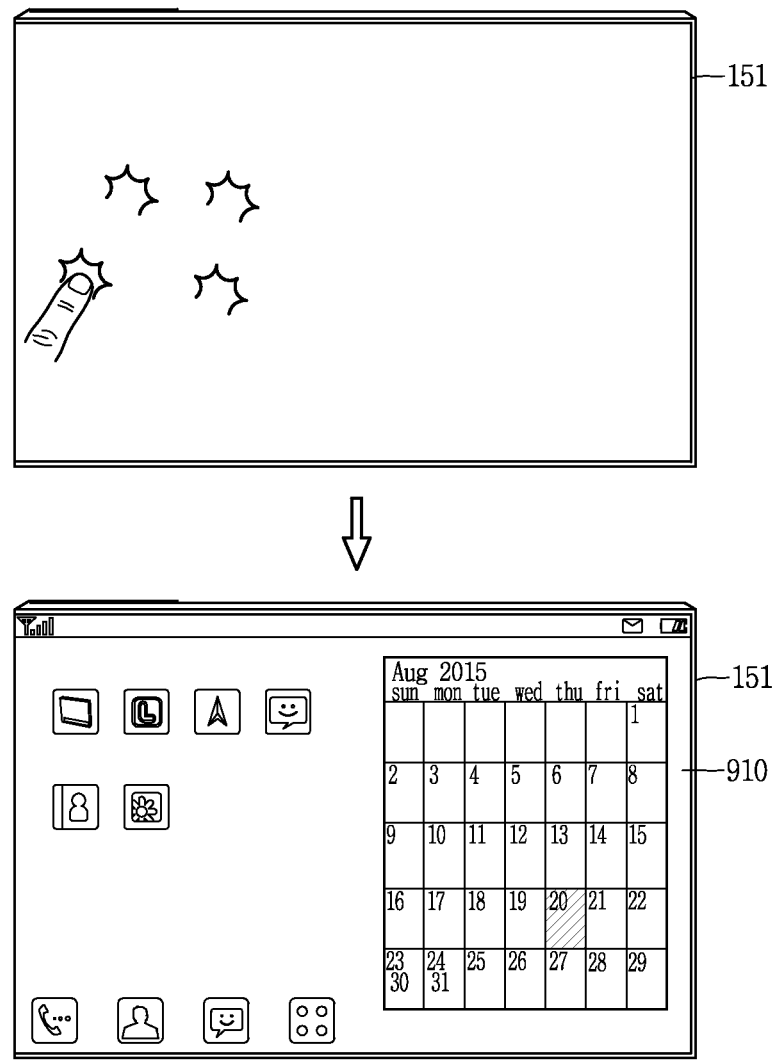
Figure 9B:
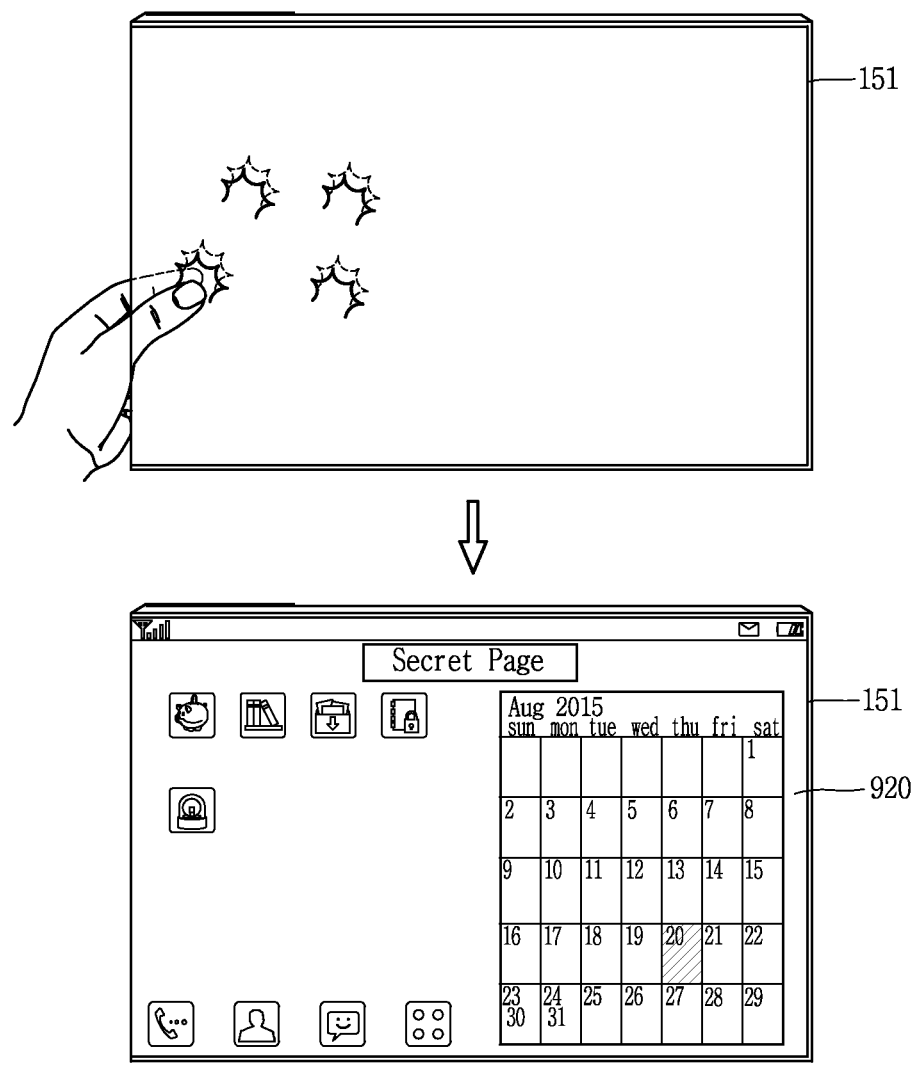

Meanwhile, the controller 180 may output different information according to a position at which touches are applied to the first and second touch regions 610 and 620. For example, as illustrated in FIG. 8A, in the turn-off state of the display unit 151, when touches are applied to a middle area of the display unit 151, the controller 180 may output information related to the specific function or specific application. On the other hand, as illustrated in a second drawing of FIG. 8B, when touches are applied to a lower area of the display unit 151, the controller 180, as illustrated in a third drawing of FIG. 8B, may output a setting window (or a setting screen) 820 for changing a set value (for example, volume, brightness, etc.) relevant to the specific function or specific application.

Here, the controller 180, as illustrated in fourth and fifth drawings of FIG. 8B, may change the set value or output an execution screen of a setting-related application according to a type of touch applied to the display unit 151 while the information is output.

For example, when a preset number of tap touches are applied to a setting screen 820, the controller 180 may change the set value relating to the specific function or the specific application. When a drag touch (a swipe touch or a sliding touch) starting from an area where the setting screen 820 is output is applied, the controller 180 may output an execution screen of a setting-related application.

Meanwhile, after the set value has changed, when the drag touch starting from the area where the setting screen 820 is output is applied to the setting screen 820 again, the controller 180 may output the execution screen of the setting-related application.

Meanwhile, the mobile terminal according to the present invention which is in a lock state may be converted into an unlock state, in response to a plurality of touches corresponding to a preset pattern applied to the display unit 151. Here, the preset pattern may be defined based on a user selection. The preset pattern may be called "knock code." The knock code may be defined by a plurality of touches. The knock code may be decided according to an applied position, order, number of each of the plurality of touches.

In the present invention, the controller 180 may control an output screen in a different manner when touches corresponding to a preset knock code are applied to one of the first and second touch regions 610 and 620 and when the touches corresponding to the preset knock code are applied simultaneously to the first and second touch regions 610 and 620.

For example, the controller 180 may release a lock state in response to an applied touch when the terminal is in the lock state, and then output a home screen page. As one example, when touches corresponding to a preset knock code are applied to the first touch region 610 as illustrated in a first drawing of FIG. 9A, the controller 180 may convert a lock state into an unlock state and output a home screen page as illustrated in a second drawing of FIG. 9A. Here, the output home screen page corresponds to a general home screen page. In addition, when the touches corresponding to the knock code are applied simultaneously to the first and second touch regions 610 and 620 as illustrated in a first drawing of FIG. 9B, the controller 180 may convert the lock state into the unlock state and output a user-specialized home screen page as illustrated in a second drawing of FIG. 9B. Here, the output home screen page corresponds to a home screen page corresponding to a private mode or a secret mode. In this manner, when the touches corresponding to the knock code are sensed simultaneously on the first and second touch regions 610 and 620, the controller 180 can provide a private home screen page which has been set separately by the user.

As another example, in the mobile terminal according to the present invention, in a turn-off state of the display unit 151, a different preset function may be performed according to a type of touch applied to the first and second touch regions.

Figure 10A:
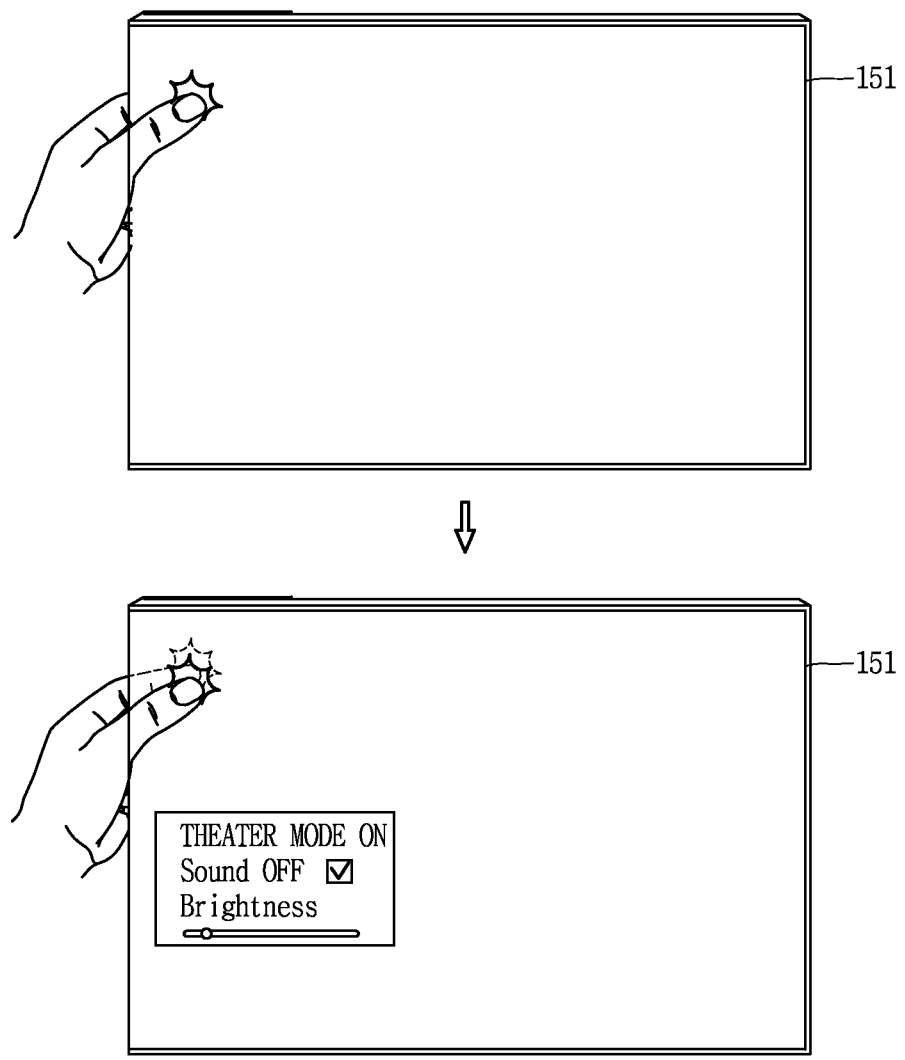

For example, as illustrated in a first drawing of FIG. 10A, when preset touches (for example, a preset number of tap touches or short touches) are applied simultaneously to the first and second touch regions 610 and 620, the terminal may enter a specific mode (for example, a theater mode). In this instance, a set value of the terminal may change into a set value corresponding to the specific mode. For example, when the specific mode is activated, the controller 180 may change at least one of setting information related to the terminal, such as a volume level, brightness, an event notification method, WiFi setting information, NFC setting information and the like. In more detail, when the preset touches (for example, the preset number of tap touches or short touches) are applied simultaneously to the first and second touch regions 610 and 620, the controller 180 may execute the theater mode, set a ring tone to be silent, set a volume level of the terminal to 0, and set brightness of the display unit to the darkest value.

Figure 10B:
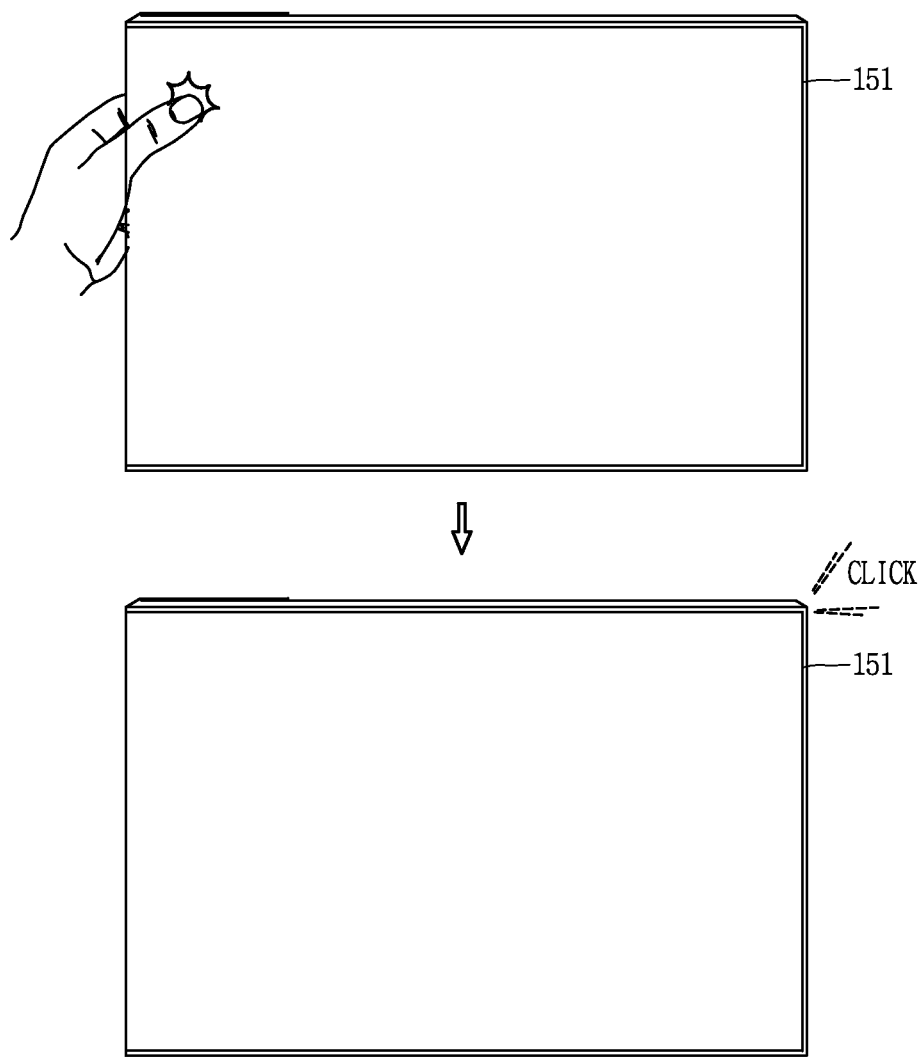

Meanwhile, as illustrated in FIG. 10B, when a different type of touch from the type of touch illustrated in FIG. 10A is applied while the display unit 151 is turned off, the controller 180 may control a different function from the function illustrated in FIG. 10A. For example, as illustrated in a first drawing of FIG. 10B, after a touch is applied to one of the first and second touch regions 610 and 620, when a touch is applied to the other area within a preset time, an image capture function may be performed. Here, the controller 180 may control the display unit 151 to be kept off. The Off state of the display unit 151 may be maintained even when the image capturing has been completed. In this instance, the captured image may be stored in a memory.

Figure 11A:
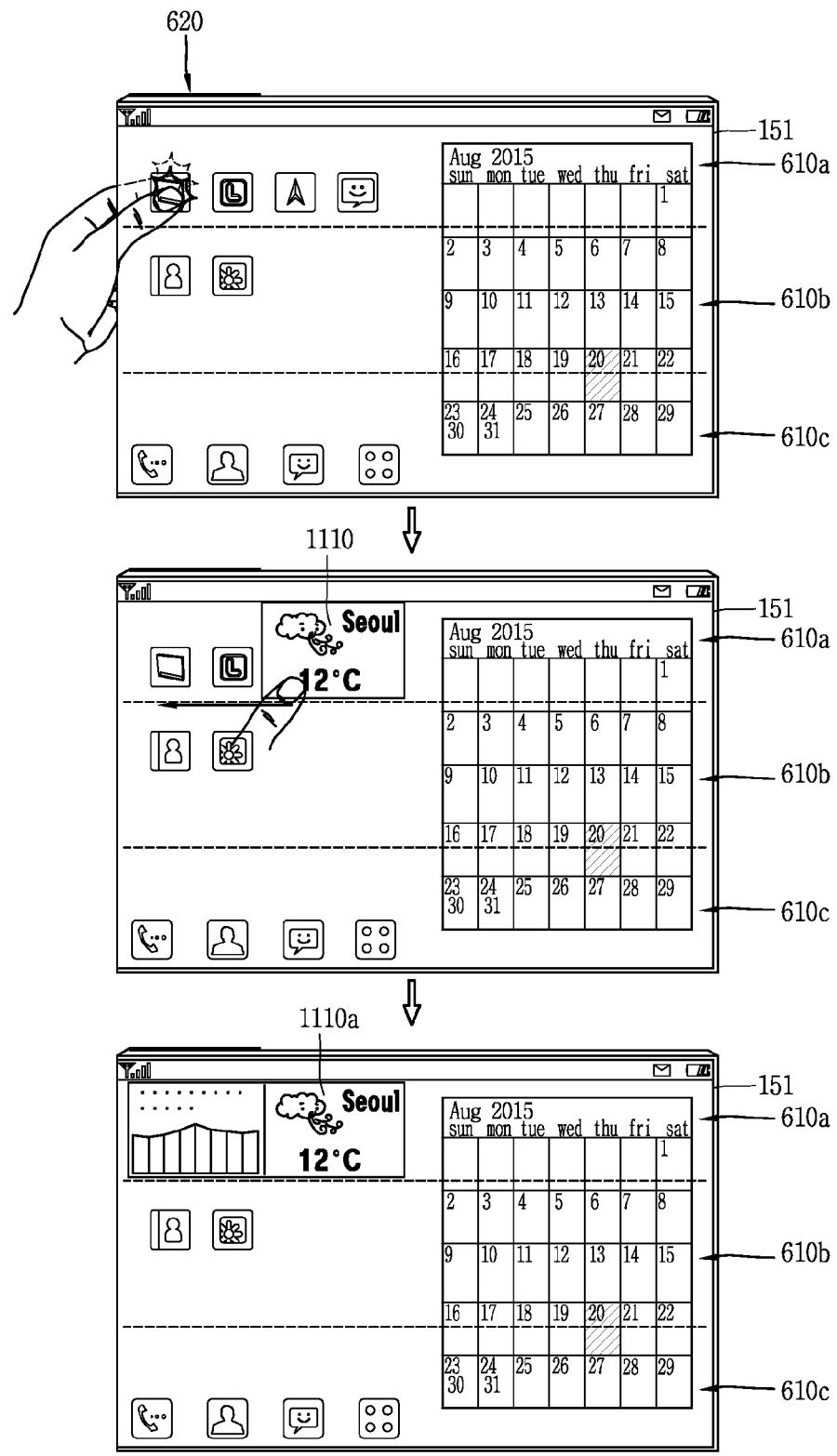
Figure 11B:
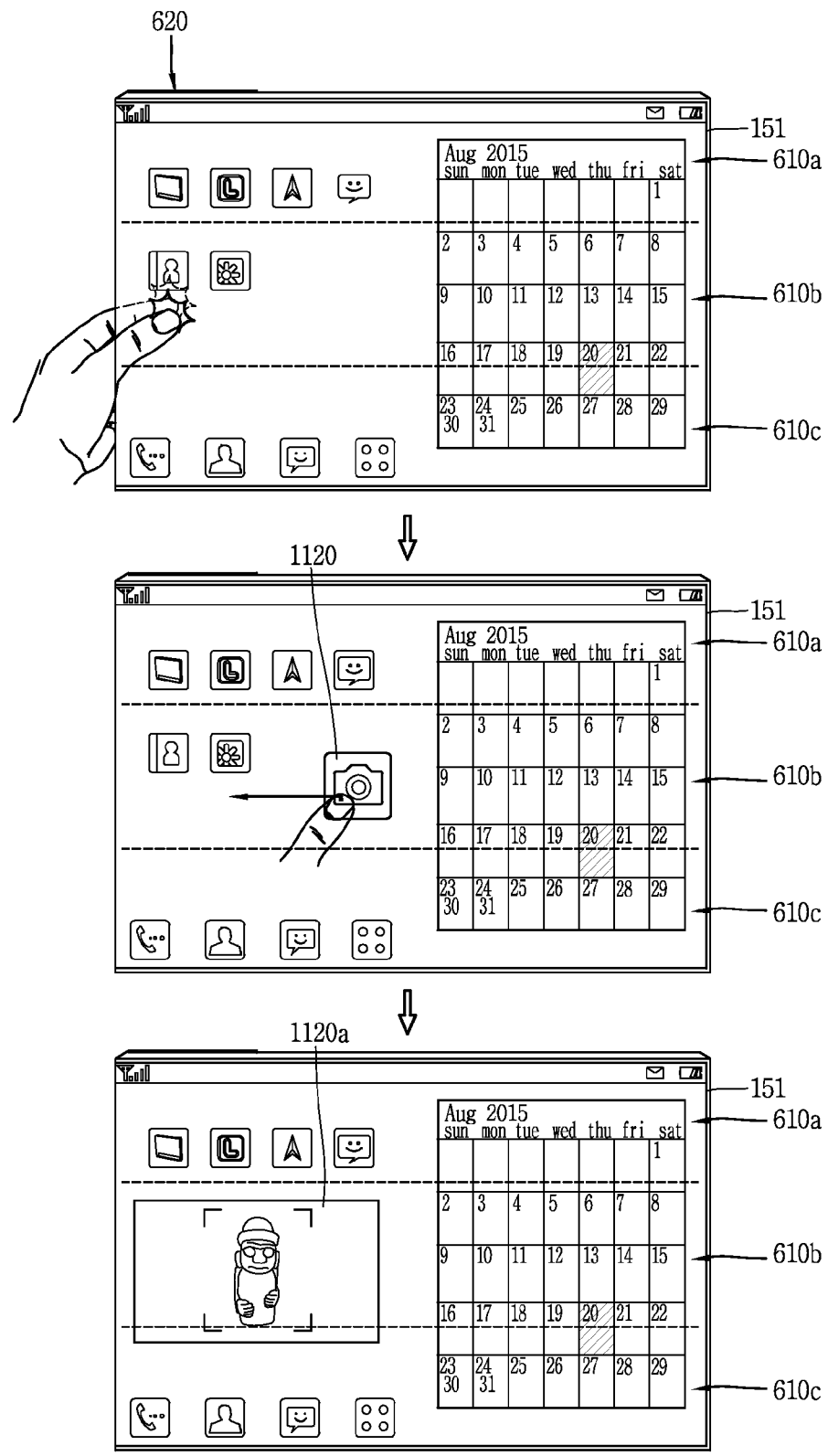

Hereinafter, description will be given in more detail of a method of performing a different function according to a position of a touch applied to the display unit while the light of the display unit 151 is turned on, with reference to the accompanying drawings. FIGS. 11A and 11B are conceptual views illustrating a method of performing various controls for a mobile terminal, using touches applied simultaneously to a first touch region and a second touch region, while a lamp (or light) of a display unit is turned on.

In the mobile terminal according to the present invention, while the display unit 151 is lighted on, when a touch is sensed merely on one of the first and second touch regions 610 and 620, a function associated with screen information output on the touch-sensed area is performed. Also, in the present invention, when preset touches are applied simultaneously to the first and second touch regions 610 and 620, the controller 180 may perform a function associated with at least one of the preset touches and a touch position, irrelevant to screen information output on the display unit 151. Here, the controller 180 may perform a different function or output different screen information according to a touch-applied position on the display unit 151. That is, the controller 180 may output different screen information according to a position or area at which touches are simultaneously applied to the first and second touch regions 610 and 620.

For example, as illustrated in FIGS. 11A and 11B, the display unit 151 may be divided into a plurality of areas, namely, first to third areas 610a, 610b and 610c. The controller 180 may output different screen information, as illustrated in FIGS. 11A and 11B, according to which one of the first to third 610a, 610b and 610c has received the touches with respect to the first and second touch regions 610 and 620.

In this instance, the controller 180 may output screen information only on an area corresponding to a touch-applied position. For example, when touches are applied simultaneously to the first and second touch regions 610 and 620, corresponding to the first area 610a, as illustrated in a first drawing of FIG. 11A, the controller 180 may output screen information on at least part of the first area 610a as illustrated in a second drawing of FIG. 11A. The screen information may be output in a manner of overlapping previously-output information.

For example, as illustrated in the first drawing of FIG. 11A, screen information (for example, weather information) 1110 corresponding to a preset function may be output on the display unit 151, in response to the touches applied to the first and second touch regions 610 and 620. In addition, when a preset touch (for example, a drag touch, a swipe touch, etc.) is applied to at least part of the output screen information 1110 as illustrated in the second drawing of FIG. 11A, the controller 180 may additionally output information (for example, detailed information) 1110a associated with the screen information 1110a as illustrated in a third drawing of FIG. 11A. In this instance, the associated information 1110a may be output up to an area over the first area 610a.

As another example, when touches are applied simultaneously to the first and second touch regions 610 and 620, corresponding to the second area 610b, as illustrated in a first drawing of FIG. 11B, the controller 180 may output screen information 1120 on at least part of the second area 610b as illustrated in a second drawing of FIG. 11B. The screen information may be output in a manner of overlapping previously-output information. For example, the screen information may be a function icon corresponding to a specific function. In more detail, the function icon may be an icon linked to a camera application.

That is, as illustrated in the first drawing of FIG. 11B, an icon 1120 for a specific function may be output on the display unit 151, in response to touches applied to the first and second touch regions 610 and 620. In addition, when a preset touch (for example, a drag touch, a swipe touch, etc.) is applied to the output icon 1120 as illustrated in a second drawing of FIG. 11B, the controller 180 may execute an application corresponding to the function icon 1120 or output an execution screen 1120a of the application as illustrated in a third drawing of FIG. 11B. In this instance, the execution screen 1120a may be output up to an area over the second area 610b.

Although not illustrated, the controller 180 may execute a function linked to the third area 610c, in response to a touch applied to the third area 610c.

Meanwhile, the foregoing description has been given of the example that the display unit is divided into three areas, but the present invention may not be limited to this. In addition, the number of areas into which the display unit is to be divided may be decided based on a user selection, and a function corresponding to each area may also be decided based on a user selection. For example, when preset touches are applied simultaneously to the first and second touch regions 610 and 620 corresponding to the third area 610c, a control linked with a memo function may be performed.

Hereinafter, description will be given in more detail of a method of controlling information output on each area of the display unit 151 divided into a plurality of areas, in response to touches applied to the first and second touch regions 610 and 620, with reference to the accompanying drawings. FIGS. 12A, 12B, 13A, 13B, 14A, 14B, 15A and 15B are conceptual views illustrating a method of controlling a content, based on touches simultaneously applied to a first touch region and a second touch region.

In the mobile terminal according to the present invention, the display unit 151 may be divided into a plurality of areas, on which different screen information may be output, respectively. For example, screen information on a first application may be output on a first area of the plurality of areas, and screen information on a second application, different from the first application, may be output on a second area of the plurality of areas. In this manner, in the state that different types of screen information corresponding to different applications are output on the plurality of areas, when preset touches are applied simultaneously to the first and second touch regions 610 and 620, the controller 180 may perform different controls associated with the screen information output on the plurality of areas.

Figure 12A:
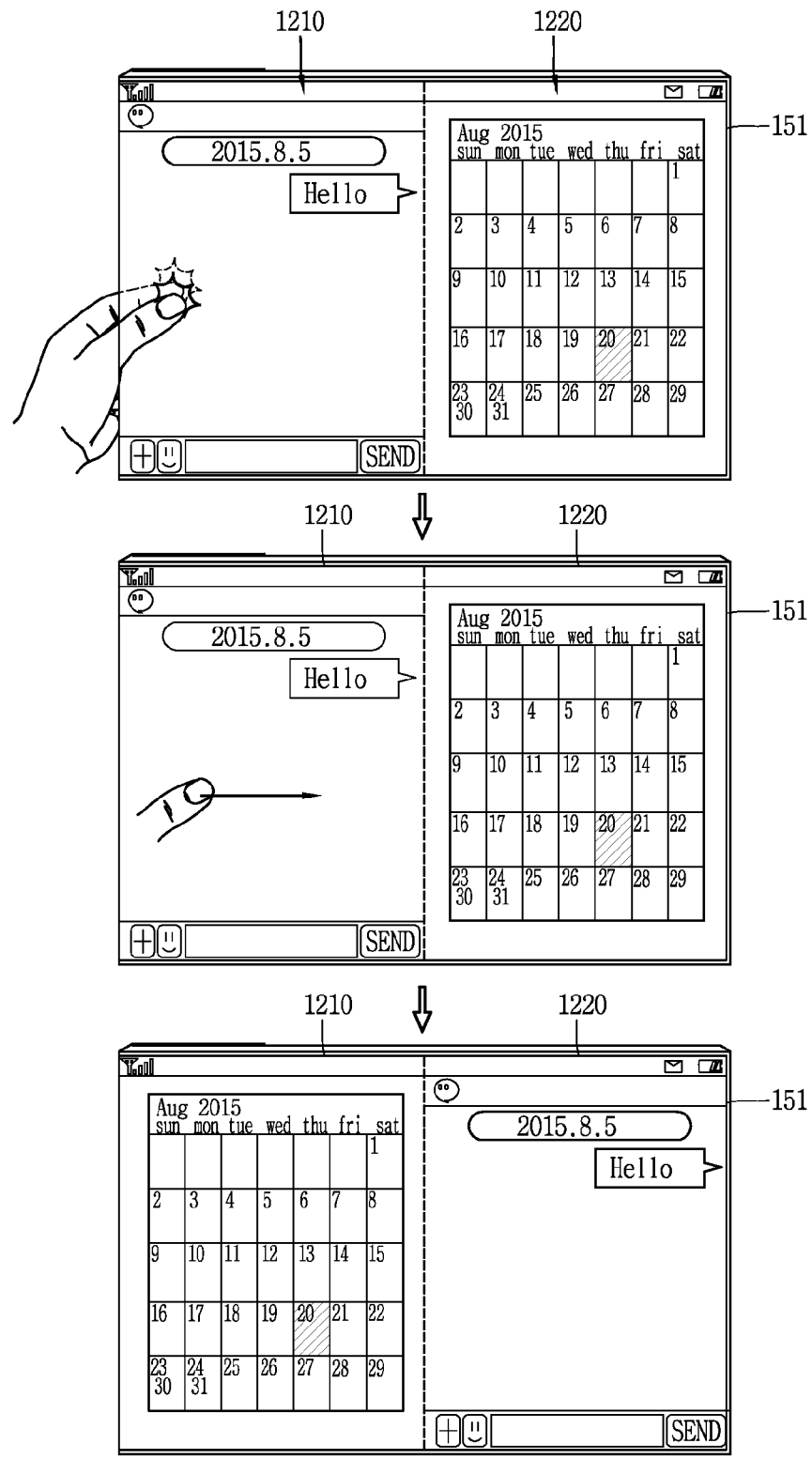
FIGS. 12A, 12B, 13A, 13B, 14A, 14B, 15A and 15B are conceptual views illustrating a method of controlling a content, based on touches simultaneously applied to a first touch region and a second touch region.

As one example, as illustrated in a first drawing of FIG. 12A, in a state that the display unit 151 is divided into first and second areas 1210 and 1220, screen information (or an execution screen) of a first application may be output on the first area 1210 and screen information (or an execution screen) of a second application may be output on the second area 1220. Here, the screen information output on the first and second areas 1210 and 1220 may be decided based on a user selection. Meanwhile, in this manner, while the different types of screen information of the different applications are output on the plurality of areas, respectively, when preset touches are applied simultaneously to the first and second touch regions 610 and 620, the controller 180, as illustrated in a third drawing of FIG. 12A, may output the screen information which was output on the first area 1210 on the second area 1220. In this instance, the screen information which was output on the first area 1210 may be output on the second area 1220. Also, when arbitrary screen information is output over the first and second areas 1210 and 1220 and screen information different from the arbitrary screen information is output only on the first area 1210 in an overlapping manner, the controller 180 may move the screen information output on the first area 1210 to the second area 1220, as illustrated in a third drawing of FIG. 12A, in response to preset touches applied simultaneously to the first and second touch regions 610 and 620.

Meanwhile, as illustrated in a second drawing of FIG. 12A, after the preset touches are applied to the first and second touch regions 610 and 620, when an additional touch is applied to the first touch region 610, output position of the screen information output on each area 1210 and 1220 may change. This is to obviously recognize a user's intent to change the output position of the screen information. In addition, the controller 180 may decide an area, to which screen information is to be moved, on the basis of an applied position of the additional touch and a direction of the additional touch.

As another example, the controller 180 of the mobile terminal may move at least part of information, which was output on one of the plurality of areas 1210 and 1220, to another area, in response to preset touches simultaneously applied to the first and second touch regions 610 and 620. In this instance, a content output on one area may be moved to another area or may be used by an application output on the another area.

Figure 12B:
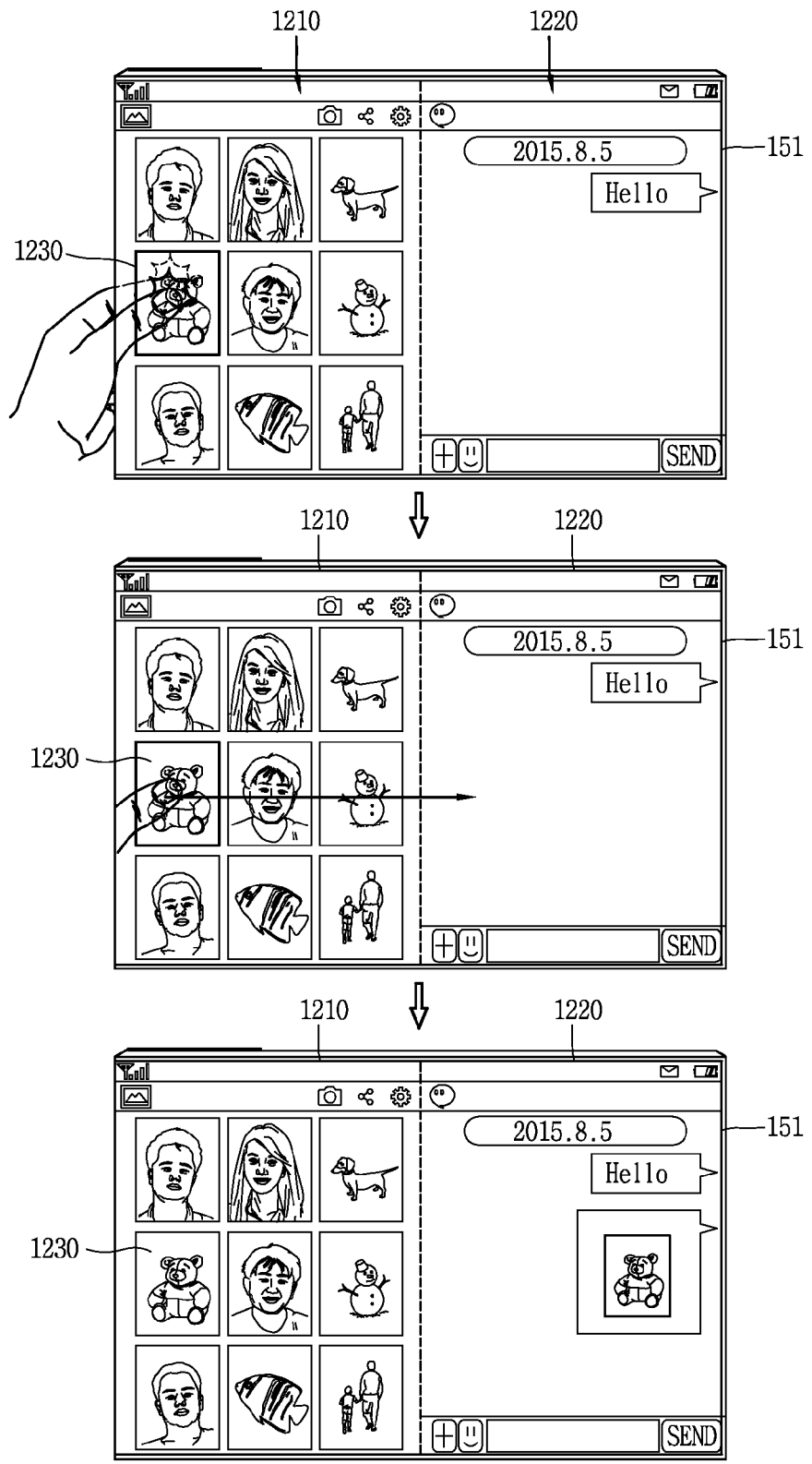

For example, as illustrated in a first drawing of FIG. 12B, when preset touches are applied simultaneously to the first and second touch regions 610 and 620 at a position corresponding to an area, on which one content 1230 of a plurality of contents relating to the first application output on the first area 1210 is output, the controller 180 may move the one content (for example, an image) 1230 to the second area 1220 including the screen information of the second application.

After the one content 1230 is selected in response to the touches applied to the first and second touch regions 610 and 620 as illustrated in the first drawing of FIG. 12B, when an additional touch (for example, a drag touch) is applied to an area where the one content 1230 is output as illustrated in a second drawing of FIG. 12B, the controller 180 may move the one content 1230 to the second area 1220 as illustrated in a third drawing of FIG. 12B. Here, the one content 1230 may be used by an application corresponding to the screen information output on the second area 1220. When the application output on the second area 1220 is a messenger application, the controller 180 may transmit the one content 1230 to a chat partner.

Meanwhile, in the mobile terminal according to the present invention, when preset touches are applied simultaneously to the first and second touch regions 610 and 620 corresponding to an output area of a specific content, a control or function associated with the specific content may be performed.

Figure 13A:
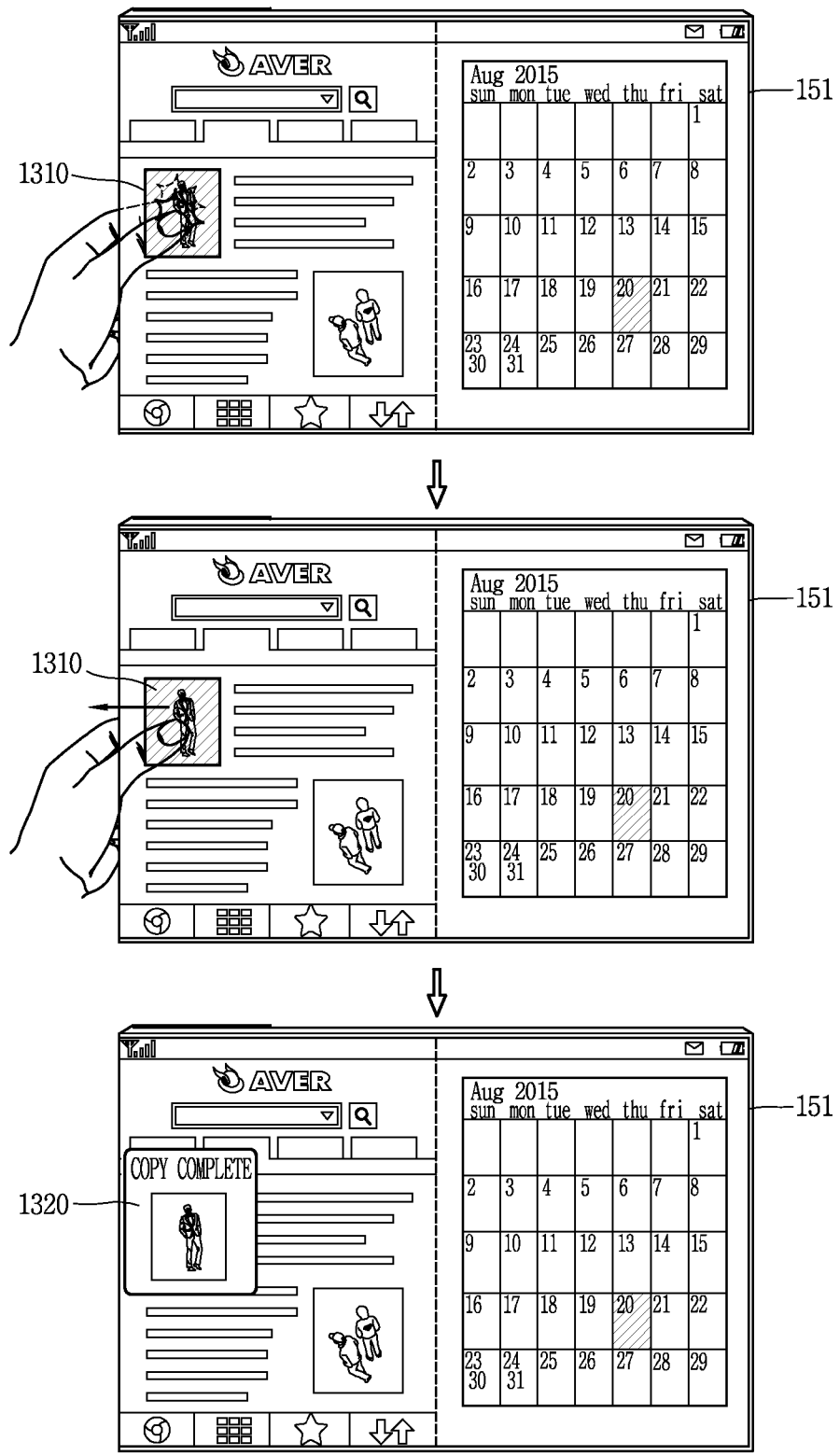
Figure 13B:
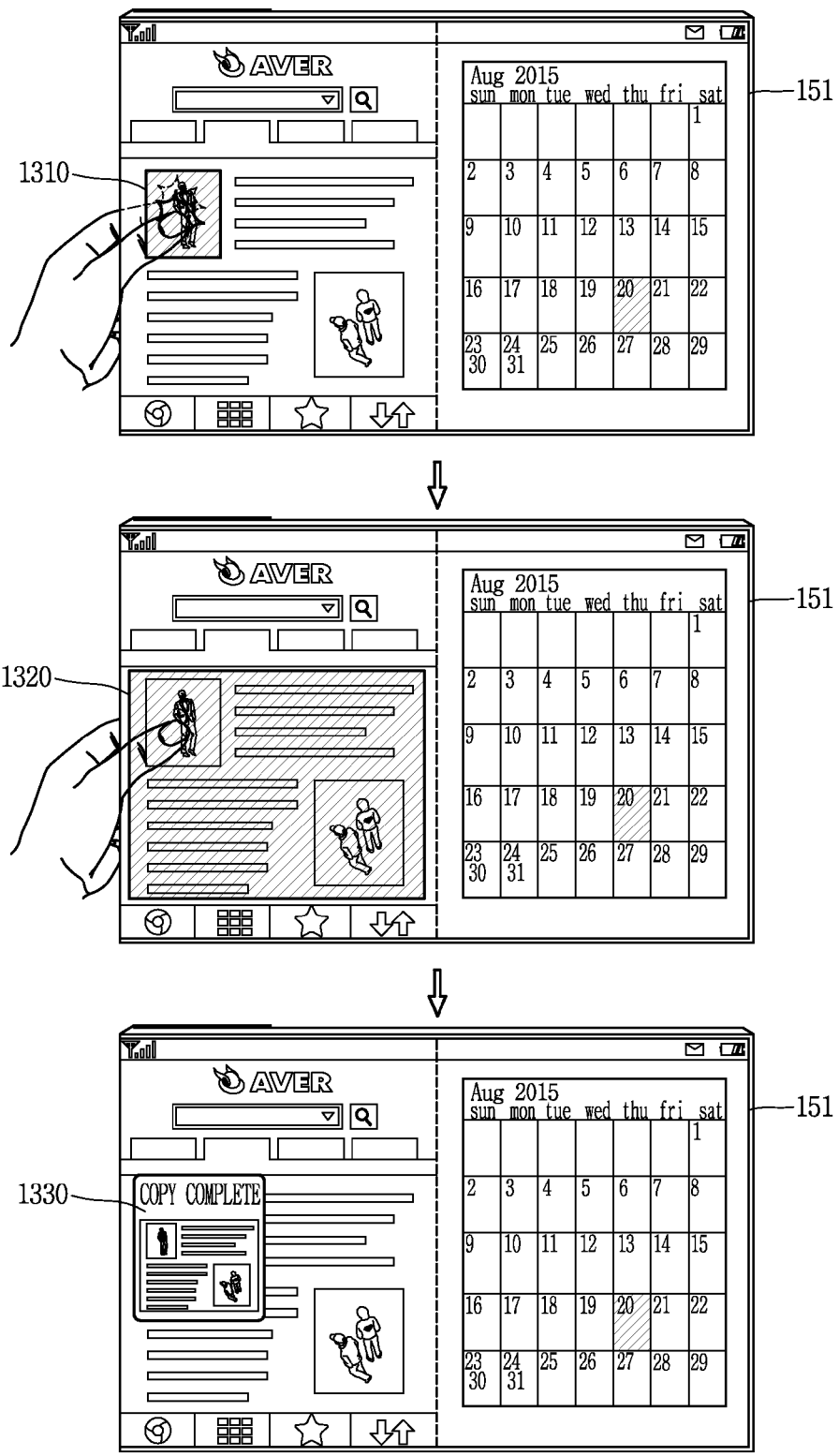

For example, as illustrated in a first drawing of FIG. 13A, when one content 1310 is selected in response to touches applied to the first and second touch regions 610 and 620, the controller 180 may perform a copy function for the content 1310. That is, the controller 180 may temporarily store the content 1310 in the memory, and thereafter paste the copied content according to a user request.

In this instance, when an additional touch (for example, a drag touch) is applied to the selected content 1310 as illustrated in a second drawing of FIG. 13A, the controller 180 may complete the copy function for the selected content 1310 as illustrated in a third drawing of FIG. 13A. In this instance, the controller 180 may output screen information 1320 notifying the completed copy on the display unit 151. Meanwhile, the controller 180 may select the specific content 1310 in response to touches simultaneously applied to the first and second touch regions 610 and 620 as illustrated in a first drawing of FIG. 13B, and set a copy range or a copy area 1320 of the content in response to an additional touch (for example, a drag touch, a pinch-in touch, a pinch-out touch, etc.) applied to the content 1310 as illustrated in a second drawing of FIG. 13B. When the copy function is completed, the controller 180 may output screen information 1330 notifying the completed copy.

Figure 14A:
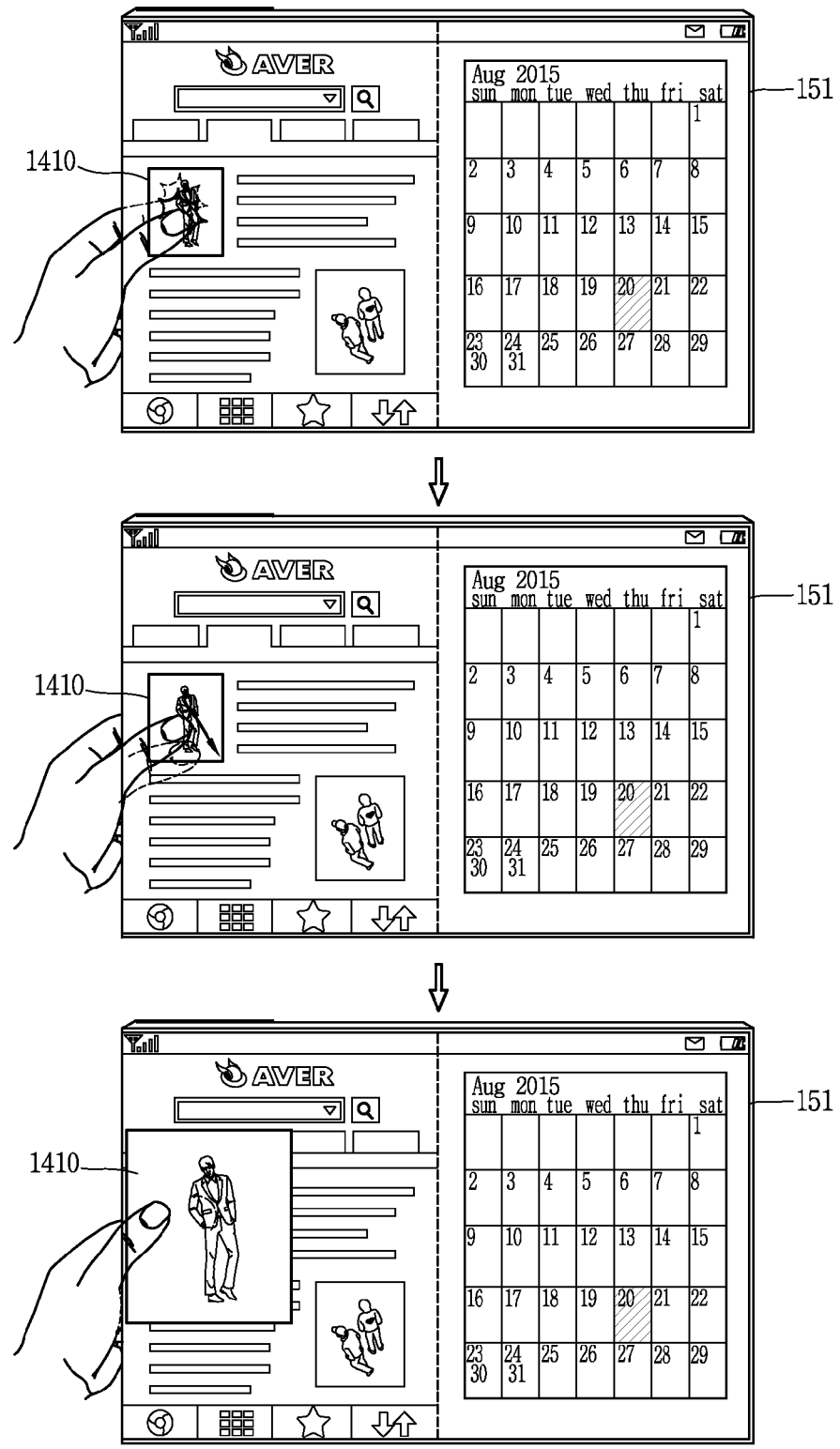

As another example, the controller 180 may select one content 1410 in response to touches applied to the first and second touch regions 610 and 620, as illustrated in a first drawing of FIG. 14A. When a preset additional touch is applied to the selected content 1410 as illustrated in a second drawing of FIG. 14A, the controller 180 may perform a function of enlarging or reducing the content 1410. The controller 180 may perform the enlargement or reduction according to an applied direction or an applied method of the additional touch. The controller 180, as illustrated in a third drawing of FIG. 14A, may enlarge the selected content 1410 when a drag touch is applied to the selected content 1410 in a first direction. Although not illustrated, when a drag touch is applied to the selected content 1410 in a second direction opposite to the first direction, the controller 180 may reduce the selected content 1410.

Figure 14B:
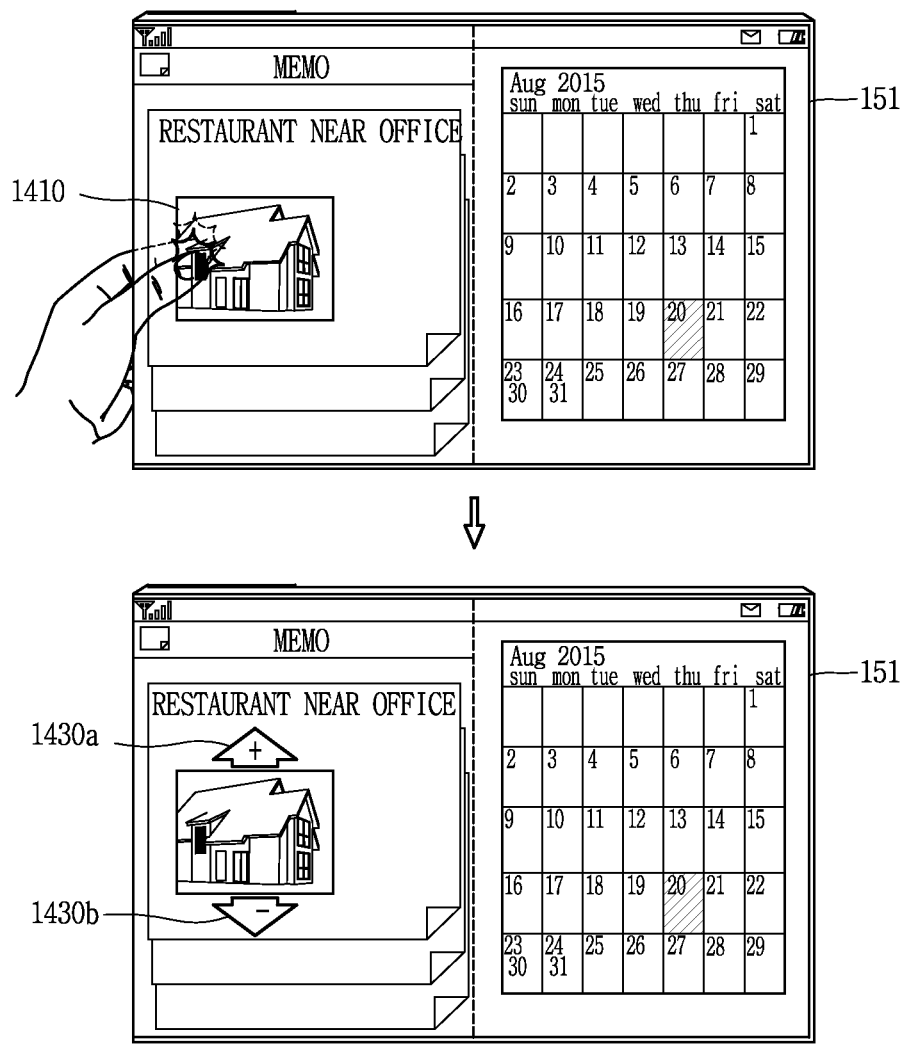

In addition, when the one content 1410 is selected in response to touches applied to the first and second touch regions 610 and 620 as illustrated in a first drawing of FIG. 14B, the controller 180 may output guide images (or indicators) 1430a and 1430b for guiding the enlargement or reduction, as illustrated in a second drawing of FIG. 14B. The guide image may guide a direction that a touch should be applied in order to enlarge or reduce a content.

Figure 15A:
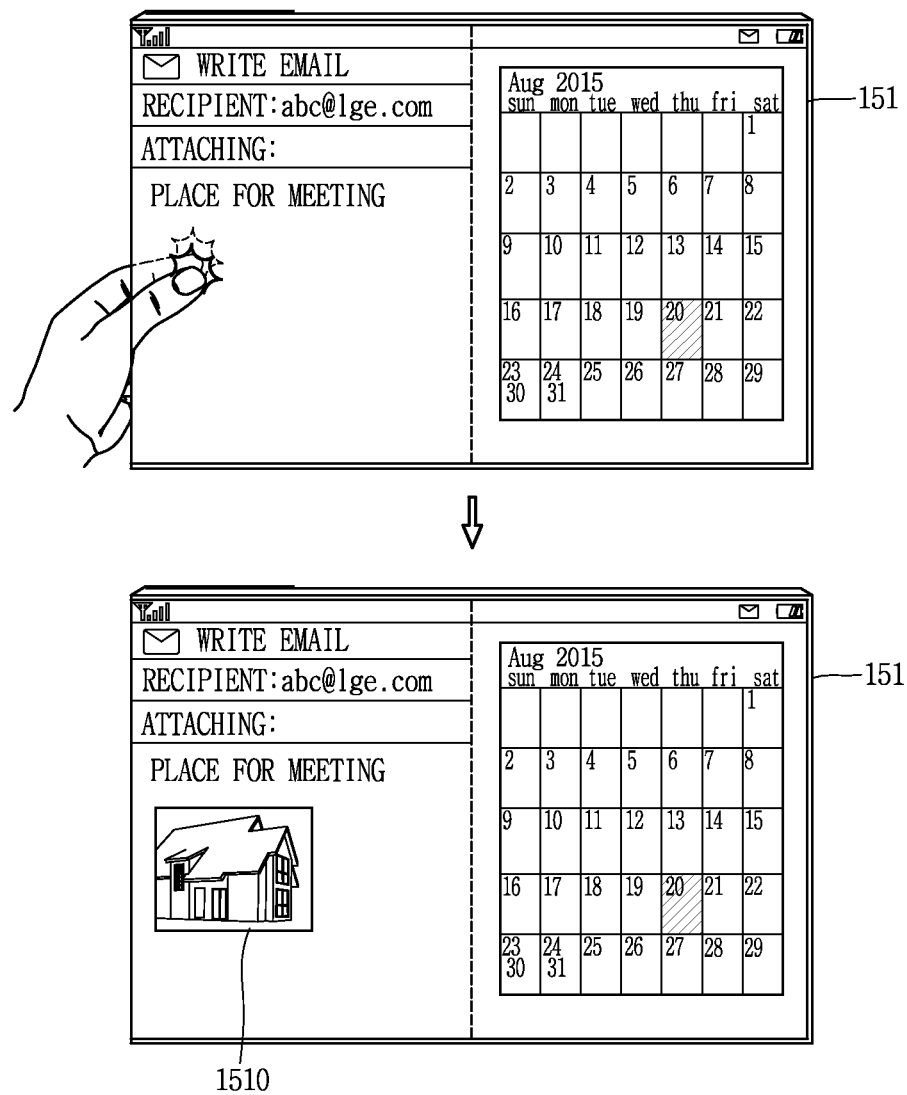

As another example, as illustrated in a first drawing of FIG. 15A, when preset touches are applied simultaneously to the first and second touch regions 610 and 620, the controller 180, as illustrated in a second drawing of FIG. 15A, may paste a previously-copied content (or a content temporarily stored in the memory or a clipboard) 1510 to a display area corresponding to an area where the preset touches are applied. That is, in this instance, the previously-copied content 1510 may be output on the corresponding display area. Meanwhile, the preset touch for the copy function and the preset touch for the paste function may differ from each other.

Figure 15B:
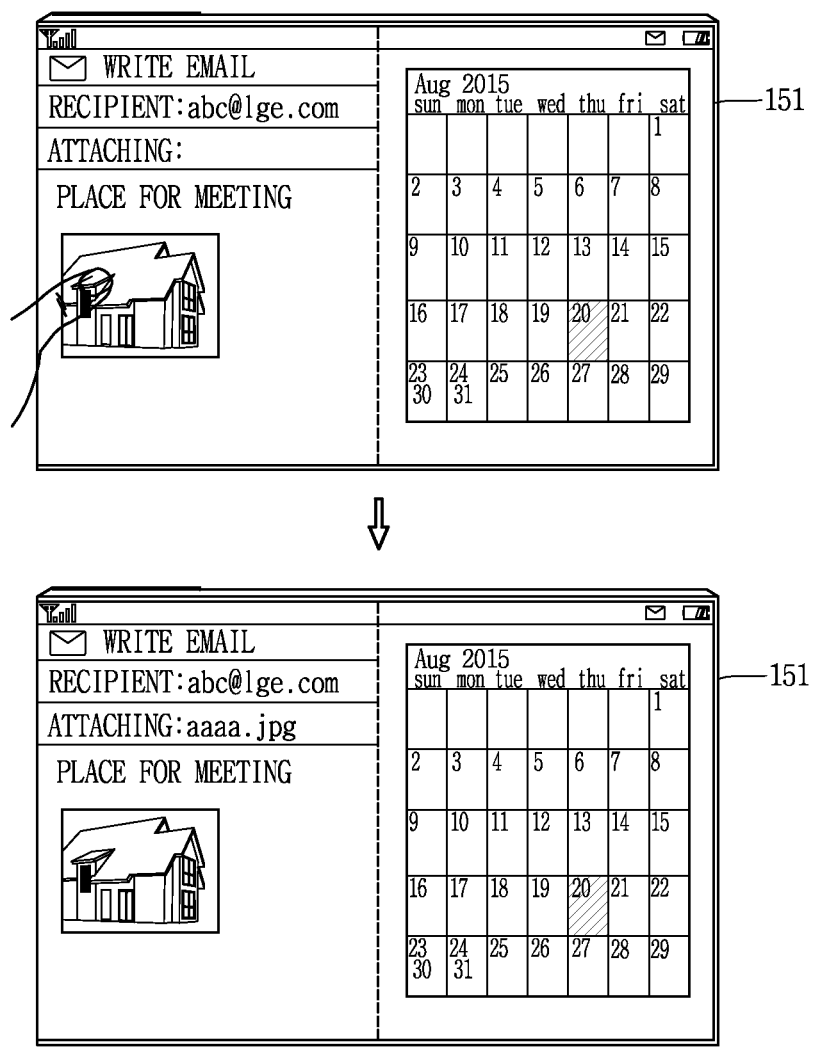

In addition, as illustrated in a first drawing of FIG. 15B, after the copied content 1510 is pasted on the corresponding display area, when a preset touch is applied to the pasted content 1510, the controller 180, as illustrated in a second drawing of FIG. 15B, may transmit the pasted content 1510 as an attached file.

That is, the controller 180 may transmit the content 1510 as the attached file to an external device using an application to which the content 1510 has been pasted.

Figure 16A:
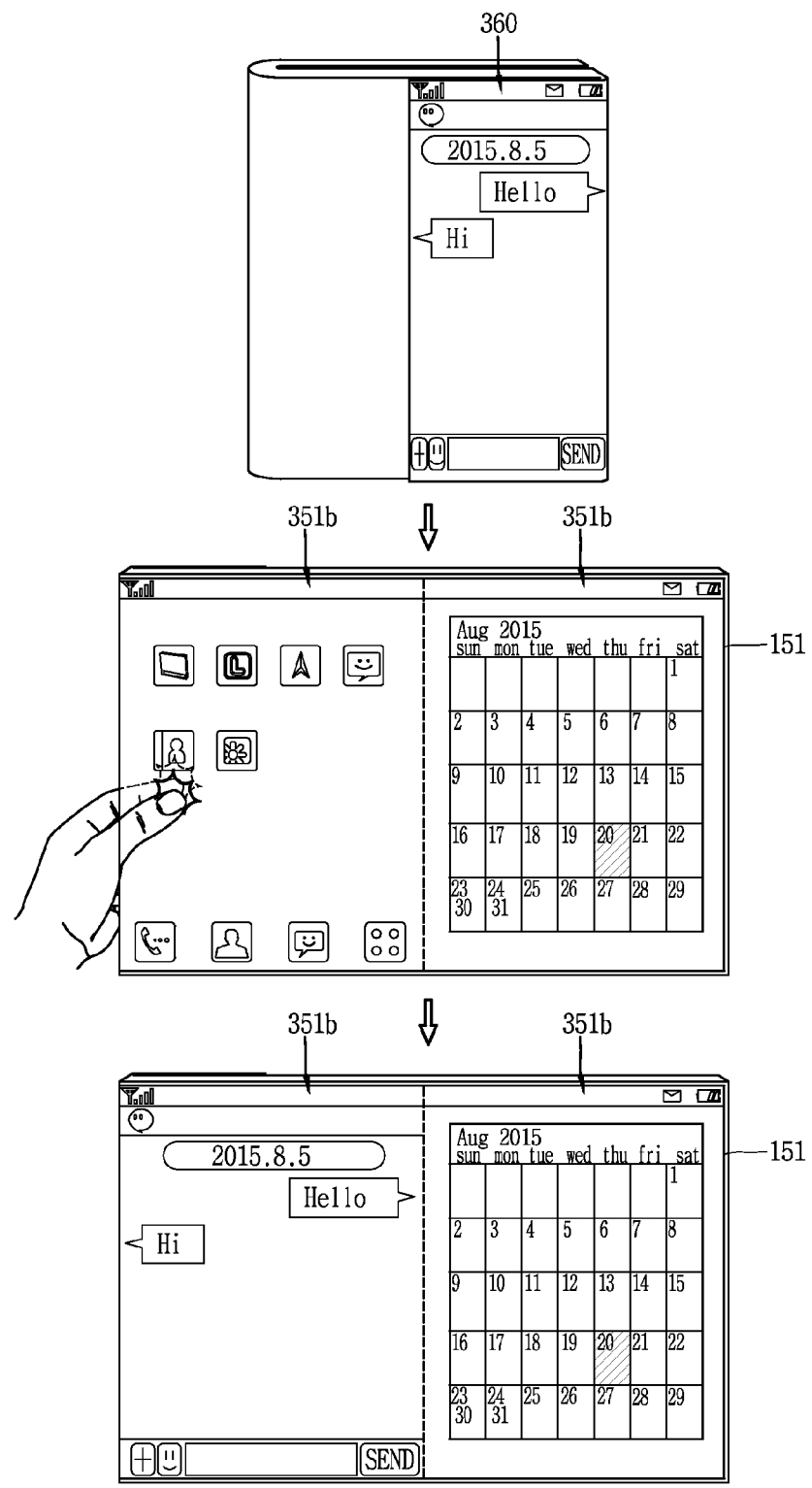
FIGS. 16A and 16B are conceptual views illustrating a method of moving information output on a second touch region to a first touch region, in response to touches applied to the first touch region and the second touch region.
Figure 16B:
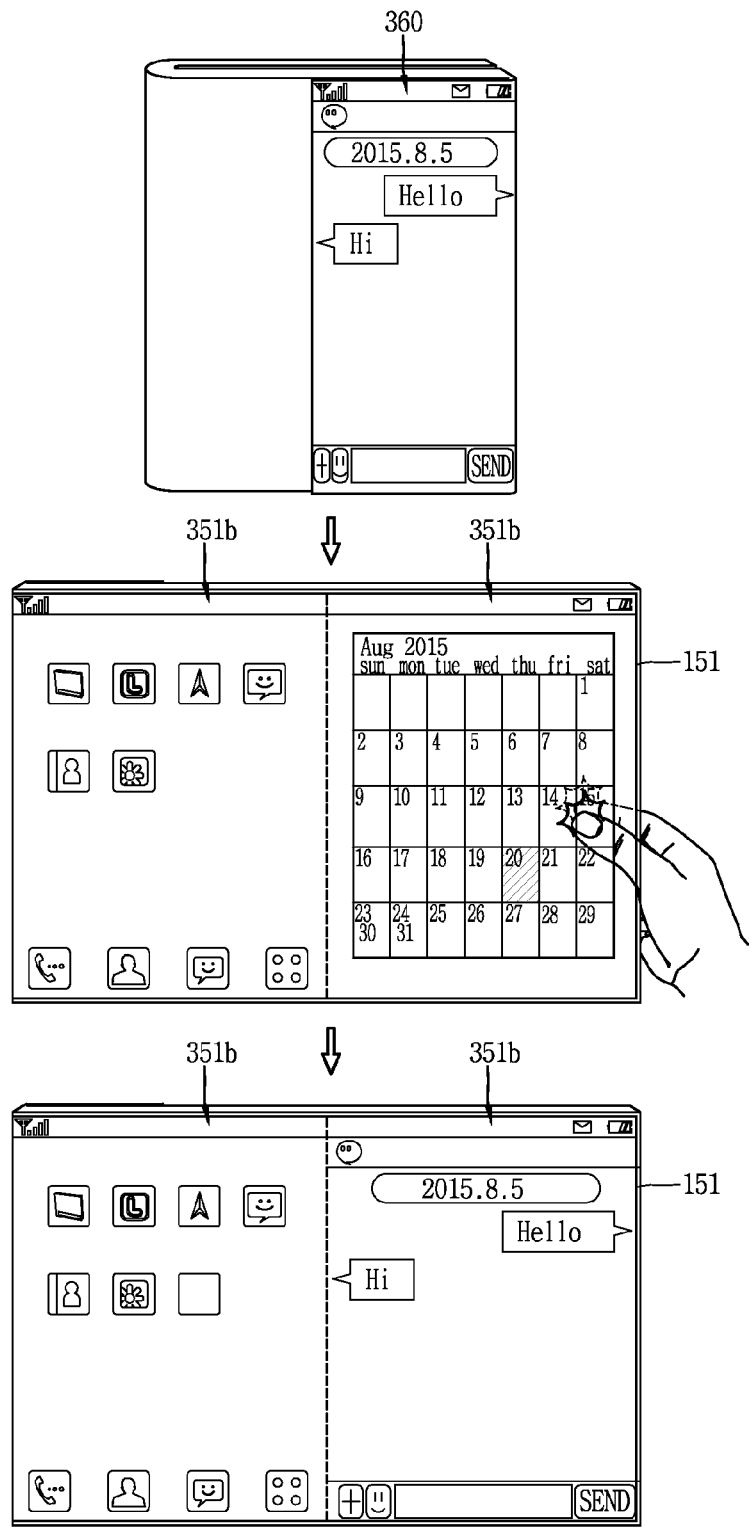

Hereinafter, description will be given in more detail of a method of changing an output position of information output on a second touch region, with reference to the accompanying drawings. FIGS. 16A and 16B are conceptual views illustrating a method of moving information output on a second touch region to a first touch region, in response to touches applied to the first touch region and the second touch region.

As aforementioned with reference to FIGS. 3A to 3C, a mobile terminal according to the present invention may be a flexible terminal. In this instance, the terminal may have front and rear surfaces and display areas may be located on both of the front and rear surfaces. The front display area may correspond to the first touch region and the rear display area may correspond to the second touch region.

Meanwhile, the front display area may be divided into a plurality of display areas 351a and 351b, and the rear display area 360 may be disposed on at least part of the rear surface of the terminal.

The controller 180, as illustrated in first drawings of FIGS. 16A and 16B, may output information using the rear display area 360 in a folded state of the terminal. Also, as illustrated in second drawings of FIGS. 16A and 16B, when the folded state of the terminal is switched into an unfolded state, the controller 180 may output information, which was output on the rear display area 360, on the front display areas 351a and 351b. In this instance, the controller 180 may decide which of the plurality of display areas 351a and 351b of the front display area is to be selected to output the information, which was output on the rear display area 360, on the basis of a position at which the touches are applied to the first and second touch regions 610 and 620.

For example, as illustrated in first and second drawings of FIG. 16A, when preset touches are applied simultaneously to the first and second touch regions 610 and 620 corresponding to a left area or the first front display area 351a after the terminal is unfolded, the controller 180, as illustrated in a third drawing of FIG. 16A, may output screen information, which was output on the rear display area 360, on the first front display area 351a. On the other hand, as illustrated in first and second drawings of FIG. 16B, after the terminal is unfolded, when preset touches are applied simultaneously to the first and second touch regions 610 and 620 corresponding to a right area or the second front display area 351b, the controller 180, as illustrated in a third drawing of FIG. 16B, may output screen information, which was output on the rear display area 360, on the second front display area 351b.

As described above, in the mobile terminal according to the present invention, information which was output on a rear display area can be moved to a front display area through a simple manipulation, such as touches applied to the first and second touch regions 610 and 620.

In addition, in the mobile terminal according to the present invention, sensing information obtained by a sensor disposed at a cover coupled to the mobile terminal can be utilized for the control of the mobile terminal. In this manner, the cooperative operations of the sensor disposed at the cover and the mobile terminal may allow a user motion with respect to the mobile terminal to be sensed more effectively.

Also, in the mobile terminal according to the present invention, an operation of the terminal can be controlled based on a user motion with respect to a rear surface of the terminal, using the sensor disposed at the cover. Therefore, the user can apply a motion to the rear surface of the terminal with a hand on which the mobile terminal is held. This may result in enhancement of user convenience and accessibility with respect to the mobile terminal.

Furthermore, the mobile terminal according to the present invention can provide a more intuitive and easier accessing method with respect to an application based on a user selection using a user motion applied to the terminal.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a terminal body;
   a display located on a first side of the terminal body, the display including a plurality of areas comprising a first area and a second area;
   a first touch sensor located at the display;
   a second touch sensor located on a second side of the terminal body, the second side being an opposite side of the first side; and
   a controller configured to:
      cause the display to display first screen information relating to a first function corresponding to first preset touches in response to the first preset touches received while the display is not illuminated,
      wherein the first preset touches comprise a first touch applied to a first touch region of the first touch sensor and a second touch applied to a second touch region of the second touch sensor, the first touch region corresponding to the first area of the display, and
      wherein the first screen information is displayed on the first area of the display while the second area remains unilluminated; and
      cause the display to display second screen information relating to a second function corresponding to second preset touches in response to the second preset touches received while the display is not illuminated,
      wherein the second preset touches comprise a third touch applied to a third touch region of the first touch sensor and a fourth touch applied to a fourth touch region of the second touch sensor, the third touch region corresponding to the second area of the display, and
      wherein the second screen information is displayed on the second area of the display while the first area remains unilluminated.

2. The mobile terminal of claim 1, wherein the controller is further configured to execute the first function when the first touch and the second touch are applied simultaneously.

3. The mobile terminal of claim 2, wherein the first touch and the second touch are applied with two fingers, a first finger associated with the first touch touching the first touch region and a second finger associated with the second touch touching the second touch region, such that the first finger, the firsts touch region, the second touch region, and the second finger are aligned along a same axis.

4. The mobile terminal of claim 1, wherein the controller is further configured to cause illumination of the first area of the display in response to the first preset touches such that the first screen information is displayed on the illuminated first area.

5. The mobile terminal of claim 1, wherein the controller is further configured to cause the display to display the first screen information when a first position of the first touch with respect to the first touch region corresponds to a second position of the second touch with respect to the second touch region or when the first position and the second position face each other.

6. The mobile terminal of claim 1, wherein the first function is not executed when only the first touch or the second touch, rather than the first preset touches, is received.

7. The mobile terminal of claim 1, wherein:
the plurality of areas of the display further include a third area;
the first area is associated with the first function, the second area is associated with the second function, and the third area is associated with a third function that are different from the first and second functions;
the controller is further configured to execute the third function associated with the third area to which one of third preset touches are applied; and
the controller is further configured to cause the display to display third screen information relating to the executed third function on the third area of the display while the first area and the second area remain unilluminated.

8. The mobile terminal of claim 7, wherein the controller is further configured to cause the display to display additional information related to the third screen information displayed on the third area in response to a touch applied to the third area while the third screen information is displayed.

9. The mobile terminal of claim 8, wherein the additional information is displayed on at least two of the first area, the second area, and the third area.

10. The mobile terminal of claim 1, wherein:
the first and second touches are tap touches;
the controller is further configured to cause the display to display the first screen information corresponding to the first function in response to the tap touches that are applied simultaneously to the first touch region and the second touch region; and
the controller is further configured to cause the display to display additional screen information corresponding to the first function in response to a drag touch applied to an output area of the display on which the first screen information is displayed.

11. The mobile terminal of claim 1, wherein the controller is further configured to execute a function associated with screen information displayed on one of the plurality of areas of the display in response to a touch applied to one of the first touch region or the second touch region while the screen information is displayed, the one of the first touch region or the second touch region including the one of the plurality of areas of the display.

12. The mobile terminal of claim 11, wherein the controller is further configured to execute the function when preset touches are applied to the first touch region and the second touch region simultaneously while a graphic object to be selected is displayed on the one of the plurality of areas of the display to which the touch is applied.

13. The mobile terminal of claim 12, wherein the screen information relating to the function corresponding to the preset touches overlaps at least part of screen information which has been previously displayed on the display.

14. The mobile terminal of claim 1, wherein:
the first preset touches are received while the mobile terminal is in a lock state;
the controller is further configured to unlock the mobile terminal in response to the first preset touches; and
the controller is further configured to cause the display to display the first screen information on at least a portion of the display when the mobile terminal is unlocked.

15. The mobile terminal of claim 1, wherein the first screen information is notification information related to applications from which events have been generated.

16. The mobile terminal of claim 15, wherein the notification information comprises a plurality of icons, each icon representing a corresponding one of the applications.

17. The mobile terminal of claim 1, wherein the display remains unilluminated except for the first area of the display when the first screen information is displayed on the first area in response to the first preset touches.

18. The mobile terminal of claim 1, wherein the first screen information is related to the first function associated with screen information that was displayed on the display prior to being turned off to be unilluminated.

19. The mobile terminal of claim 18, wherein the controller is further configured to cause the display to:
re-display the screen information related to the first function and stopped being displayed when the display was turned off in response to a first type of touch received on the display while the first screen information is displayed; and
display screen information that is not related to the first function in response to a second type of touch received on the display while the first screen information is displayed.

* * * * *